US007302536B2

(12) United States Patent
Watanabe

(10) Patent No.: US 7,302,536 B2
(45) Date of Patent: Nov. 27, 2007

(54) METHOD AND APPARATUS FOR MANAGING REPLICATION VOLUMES

(75) Inventor: Naoki Watanabe, Kanagawa-ken (JP)

(73) Assignee: Hitachi, Ltd., Tokyo (JP)

( * ) Notice: Subject to any disclaimer, the term of this patent is extended or adjusted under 35 U.S.C. 154(b) by 281 days.

(21) Appl. No.: 10/463,366

(22) Filed: Jun. 17, 2003

(65) Prior Publication Data

US 2004/0260873 A1   Dec. 23, 2004

(51) Int. Cl.
*G06F 12/16*   (2006.01)
*G06F 12/00*   (2006.01)

(52) U.S. Cl. .................. 711/162; 711/112; 711/154; 711/114

(58) Field of Classification Search ............ 711/112, 711/162, 4, 114, 221; 709/226; 714/6
See application file for complete search history.

(56) References Cited

U.S. PATENT DOCUMENTS

| | | | | |
|---|---|---|---|---|
| 5,682,513 | A * | 10/1997 | Candelaria et al. ......... | 711/113 |
| 6,029,254 | A * | 2/2000 | Andrews ....................... | 714/6 |
| 6,035,412 | A | 3/2000 | Tamer et al. | |
| 6,237,008 | B1 | 5/2001 | Beal et al. | |
| 6,434,682 | B1 * | 8/2002 | Ashton et al. .............. | 711/162 |
| 6,457,109 | B1 * | 9/2002 | Milillo et al. ............... | 711/162 |
| 6,487,645 | B1 * | 11/2002 | Clark et al. .................. | 711/162 |
| 6,499,091 | B1 | 12/2002 | Bergsten | |
| 6,742,138 | B1 * | 5/2004 | Gagne et al. ................... | 714/6 |
| 6,907,507 | B1 * | 6/2005 | Kiselev et al. .............. | 711/162 |
| 2001/0001870 | A1 * | 5/2001 | Ofek et al. .................. | 711/112 |
| 2001/0013087 | A1 * | 8/2001 | Ronstrom ................... | 711/133 |
| 2003/0204597 | A1 * | 10/2003 | Arakawa et al. ............ | 709/226 |

OTHER PUBLICATIONS

American National Standards Institute, Fibre Channel—Physical and Signaling Interface (FC-PH), Rev. 4.3, Jun. 4, 1994, TOC and pp. 1-31, Global Engineering, 15 Inverness Way East, Englewvod, CO 80112-5704, USA.
American National Standards Institute, Fibre Channel—Switch Fabric (FC-SW), Rev. 3.0, Feb. 3, 1997, TOC and pp. 1-64, Global Engineering, 15 Inverness Way East, Englewvod, CO 80112-5704, USA.
DPANS, "Project T10/1236-D: Information Technology—SCSI Primary Commands -2 (SPC-2)", dpANS SCSI Primary Commands-2 (SPC-2), Jul. 18, 2001, TOC and pp. 43-79, Ralph O. Weber, ENDL Texas, Dallas, TX 75252, USA.
Hitachi Data Systems, "Hitachi Freeedom Storage TM Software Solutions Guide", Jan. 2003, TOC and pp. 1-73, Copyright 2003 Hitachi Data Systems Corporation.

* cited by examiner

*Primary Examiner*—Hyung Sough
*Assistant Examiner*—Mardochee Chery
(74) *Attorney, Agent, or Firm*—Sughrue Mion, PLLC.; Pavel I. Pogodin

(57) ABSTRACT

Aspects of the invention provide for at least one first data portion of a first storage device in a system to be updated to a second storage and further replicating the update to a second data storage portion of the second storage device if a substantial system error fails to occur during the updating of the first data storage portion. Aspects can, for example, include facilitating restoration of a primary or secondary volume of a primary storage device or of a first or second secondary storage via secondary storage device copying, and/or alternative, alternating or internal/external application driven first and second (and/or further) secondary storage portion utilization. Aspects can also include state driven synchronization or re-synchronization of local and remote copies, or one or more of storage devices utilized can, for example, include a disk array.

37 Claims, 15 Drawing Sheets

(System Example)

(System Example)

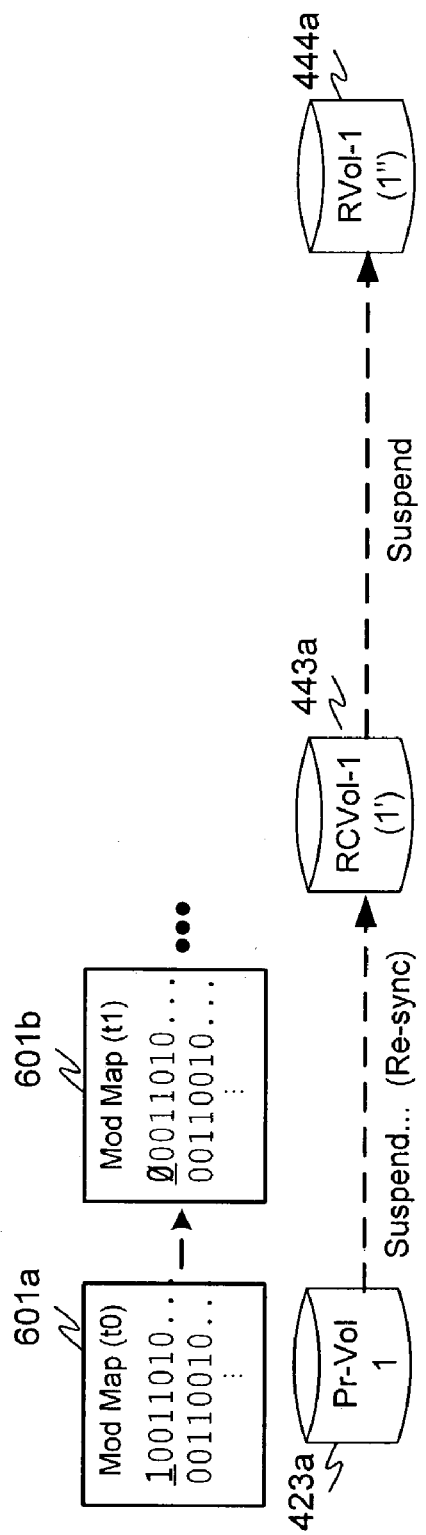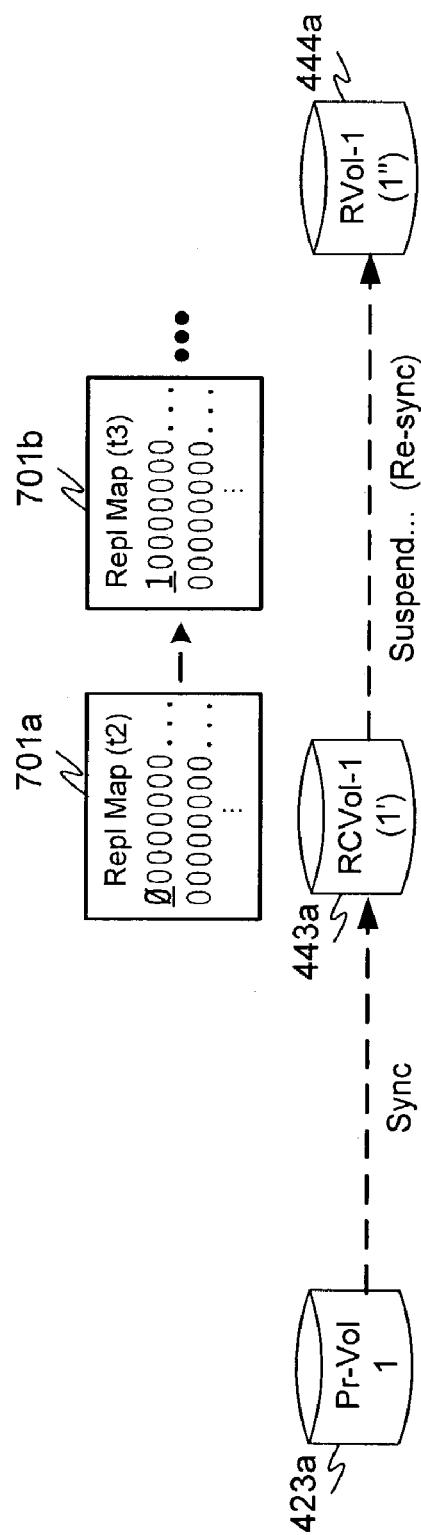

Primary Storage GroupVolume Reference Map (SG-1)

| Volume | Set-1 | | Set-2 | | ... | Set-k | |
|---|---|---|---|---|---|---|---|
| | Port | ID | Port | ID | | Port | ID |
| Volume 1-1 | P-1 | 1-1-1 | | | | | |
| Volume 1-2 | P-1 | 1-1-2 | ... | | | | |
| ⋮ | | | | | | ⋮ | |
| Volume 1-m | P-3 | 1-1-3 | ... | | ••• | | |

*FIG. 11a*

Remote Copy Storage Group Vol. Reference Map (SG-2)

| Volume | Set-1 | | Set-2 | | ... | Set-k | |
|---|---|---|---|---|---|---|---|
| | Port | ID | Port | ID | | Port | ID |
| Volume 1-1' | P-1 | 1-1-1 | | | | | |
| Volume 1-2' | P-1 | 1-1-2 | ... | | | | |
| ⋮ | | | | | | ⋮ | |
| Volume 1-m' | P-3 | 1-1-3 | ... | | ••• | | |

*FIG. 11b*

Local Copy Storage Group Vol. Reference Map (SG-3)

| Volume | Set-1 | | Set-2 | | ... | Set-k | |
|---|---|---|---|---|---|---|---|
| | Port | ID | Port | ID | | Port | ID |
| Volume 1-1" | P-1 | 1-1-1 | | | | | |
| Volume 1-2" | P-1 | 1-1-2 | ... | | | | |
| ⋮ | | | | | | ⋮ | |
| Volume 1-m" | P-3 | 1-1-3 | ... | | ••• | | |

*FIG. 11c*

| | Secondary Volume Status | | |
|---|---|---|---|
| State # | Remote Copy Status | Local Copy Status | Attach Subgroup |
| 1 | Sync/Suspend | Sync/Suspend | 2 |
| 2 | Re-Sync | Sync/Suspend | 3 |
| 3 | Sync/Suspend | Re-Sync | 2 |

METHOD AND APPARATUS FOR MANAGING REPLICATION VOLUMES

BACKGROUND OF THE INVENTION

1. Field of the Invention

This invention relates generally to computer systems, and more particularly provides a system and methods for managing replication data, such as volumes.

2. Background

The proliferation of computing continues to increase the amount of data generated, transferred and stored, as well as reliance on the integrity of such data. Approaches to assuring data integrity generally fall into two categories: error handling and data backup.

Error handling can include determining whether data processed, transferred or stored appears to include errors, or further attempting to cause reporting or correction of determined errors. Examples of error handling mechanisms include but are not limited to data portion verification, version comparison, checksum calculation or re-transmission, among others.

Conventional data backup essentially provides for copying data stored in a "primary" storage to a typically separate "backup" storage copy such that: (1) after the backup copy is created, the copy can be restored to the primary storage data if a primary storage error is later detected, and (2) after the restoring, the restored primary storage data can again be reliably used. The particular storage device or media used for storing the backup copy can vary, and can reside locally, typically via a fixed interconnection to a tape or other removable media, or remotely, typically via a wired or wireless network to a remote backup system.

Typically, only an initial backup is completely conducted of all designated primary data. Thereafter, only primary data that has been modified since the last backup is stored to the backup copy. Most often, the primary storage maintains a primary storage change table indicating modified primary storage data portions. During backup, the change table is read sequentially, and where a table entry indicates a modified primary data portion, a copy of the modified data portion is transferred to the backup system. The backup system then either separately stores the copy of the modified primary data portion (e.g., as with versioning) or replaces the corresponding backup data portion with the modified primary data portion.

It is observed, however, that conventional backup systems can be problematic. For example, conventional backup systems fail to account for system errors that might occur during, rather than after, the backup procedure. The primary storage, transmission medium or backup storage might, for example, become inoperable after initiating and before completing storage of the backup copy. In such cases, the primary data, backup copy or both might be rendered unreliable should system operation be restored. Data backup might also be conducted with regard to a large amount of data, thereby rendering the applicable data largely inaccessible during backup, among other problems.

Accordingly, there is a need for methods and apparatus that enable data backup to be conducted, and also enable data loss due to system errors during a backup to be avoided. There is further a need for methods and apparatus that enable the backed up data to be more accessible and usable.

SUMMARY OF THE INVENTION

Aspects of the invention enable primary storage data or secondary storage data to be replicated such that a loss of primary or secondary data due to a concurrent or other system error might be avoided. Aspects further enable one or more of secondary data or other portions to be usable for at least one of restoration to the primary or one or more secondary storage, alternative/alternating storage portion utilization or direct use of one or more secondary data sets as alternative primary data, among other uses. Aspects also enable such data to be more accessible, for example, enabling data be handled in accordance with intra/inter storage grouping of corresponding data or selectable data portion identification, among further aspects.

One aspect enables a primary data storage portion of a first storage device to be updated to at least two secondary storage copies within at least one backup or other secondary storage device, such that at least one secondary copy remains unchanged during updating of another copy. Another aspect enables determining whether one or more updates from a primary data store to a first data storage portion of a secondary data store have been replicated within a second data storage portion of the secondary data store. Among other aspects, a further aspect enables at least one of error resistant backing up, restoring and/or redirecting of data and/or read, store or other requests to be conducted in conjunction with one or more disk arrays and/or other storage devices.

In a replication managing method example according to the invention, at least one first data portion of a first storage device in a system is updated to a second storage that is capable of storing the update to a first data storage portion, and further replicating the update to a second data storage portion of the second storage device if a system error fails to occur during the updating of the first data storage portion. The method can, for example, include backing up a primary storage device to a secondary storage device, and one or both of the storage devices can, for example, include a disk array.

In a further replication managing method example, a secondary storage receives a data modification from a primary storage. The secondary storage synchronizes the data modification with a first secondary store (e.g., backup) of the primary storage data. Upon substantially completing the synchronizing, the secondary storage further synchronizes or replicates the data modification from the first secondary store to a second secondary store of the secondary storage, thereby enabling of at least one of the primary, first secondary or second secondary store data to be unaffected if a system or other error occurs during the backup.

In a replication management system example, a primary storage includes a primary data synchronization map indicating a modified data portion requiring updating to a secondary storage, and a secondary storage includes an updated local copy indicator indicating local copy data that has been updated from a first updated secondary storage portion to a second secondary storage portion, a transfer equal for synchronizing the primary storage data to the secondary storage and a replication manager for replicating to a local copy of the secondary storage data.

A system example includes, within a secondary storage and a storage media storing a remote copy of primary storage data, and a replication manager that provides for determining at least one of the remote copy or a local copy of the remote copy to select for responding to a received access request. The replication manager can, for example, further be configured to conduct access requests including a direct read/write request or a request diverted from the primary storage, that correspond with a data item or data item group, or that include a request to restore primary storage data, or the determining can impose one or more store, read, data portion selection/synchronization, requester, receiving device, throughput, timing, security or other preferences, among other combinable alternatives in accordance with a particular application.

Advantageously, aspects of the invention enable a loss of data of a primary data store and/or a secondary data store to be recoverable. Aspects further enable restoration of remote data or other uses of primary and/or replicated storage data. Other advantages will also become apparent by reference to the following discussion and figures.

BRIEF DESCRIPTION OF THE DRAWINGS

FIG. 6a is a flow diagram illustrating the update procedure of FIG. 5 in greater detail, and with the use of a primary storage modification mapping, according to an embodiment of the invention;

FIG. 6b is a flow diagram illustrating the update procedure of FIG. 5 in greater detail, and with the use of a local storage update mapping, according to an embodiment of the invention;

FIG. 11a illustrates a reference map for referencing primary storage data, according to an embodiment of the invention;

FIG. 11b illustrates a reference map for referencing secondary storage remote copy data, according to an embodiment of the invention;

FIG. 11c illustrates a reference map for referencing secondary storage local copy data, according to an embodiment of the invention;

DETAILED DESCRIPTION

In providing for replication managing systems and methods, aspects of the invention enable source storage data to be replicated such that a loss of data due to a system error during a secondary storage update, such as a data backup, might be avoided. Synchronization of primary storage data is, for example, enabled such that secondary storage data might be useable, despite a system error during updating, for purposes that can include at least one of restoration to the primary storage, restoration to an alternative storage or direct use of replicated data as alternative or alternating primary data, among other combinable applications.

Note that the term "or", as used herein, is intended to generally mean "and/or", unless otherwise indicated. Also note that, for clarity sake, the following examples will be directed primarily at data backup/restore applications, such that the invention might be better understood. It will become apparent, however, that replication management implementations enable a variety of applications, including but not limited to one or more of data comparison, archival, prior state recovery, alternative primary storage, or distributed processing of primary/replicated data or data requests, among others. Further, more than one storage might be used as a secondary storage, and "backup" might include one or more of replication to a same storage, a common storage or even bi-directional or multi-directional backup or other replication among multiple devices, among other combinable alternatives.

Figure 1:
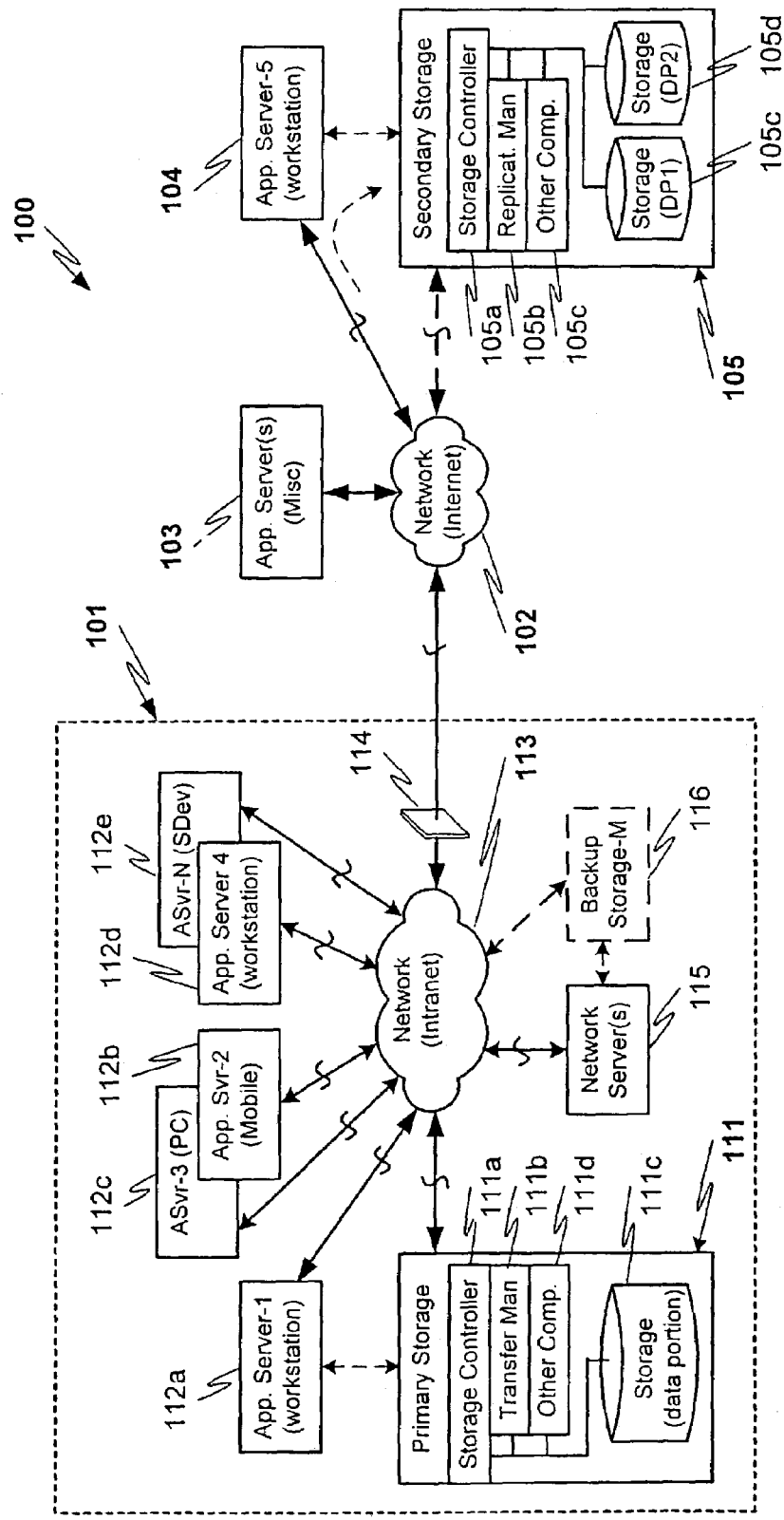
FIG. 1 is a flow diagram illustrating an interconnected system employing an exemplary replication management system, according to an embodiment of the invention.

Turning now to FIG. 1, an exemplary interconnected system 100 is illustrated that is configured to provide for replication management in conjunction with one or more computing devices coupled via an interconnected network.

Replication management system 100 includes a network subsystem 101, such as a corporate intranet, having components coupled via a local area network or "LAN", e.g., intranet 113. Subsystem 101 components include primary storage 111, application servers 112a-e, one or more network servers 115 and secondary (e.g., backup) storage 116. System 100 also includes components coupled via network 102, e.g., the Internet or another wide area network or "WAN". Such components include application servers 103, 104 and secondary storage 105. System 100 can also include one or more of firewalls (e.g., firewall 114), routers, caches, redundancy/load balancing systems, further backup systems or other interconnected network components (not shown) can be statically configured or reconfigurable, according to the requirements a particular application.

Primary storage 111 provides a storage for storing data produced by one or more of application servers 112a-e, 103, 104 or network servers 115. That is, while other storage devices might also be used for storing data, such as backup storage 116 or secondary storage 105 (or primary storage might also be used for other purposes), it is presumed for the present example that data storage and retrieval is generally conducted using primary storage 111. (For purposes of replication management for backup or other secondary storage updating applications, a storage device operates as a primary storage where a portion of data stored therein serves as source data from which a secondary storage update, such as including data replication or synchronization, can be conducted.) Primary storage 111 includes storage controller 111a, transfer manager 111b and storage media 111c, and can also include other components 111d.

Storage controller 111a provides for generally managing primary storage operation. Such managing can, for example, include communicating with other system 100 components, e.g., application servers 112a-e, 103, 104, in conjunction with storage and retrieval of a data stored in storage media 111b, or causing such storage, retrieval and support functions to occur. Support functions, for example, can include creating, maintaining and deleting data space references. Such references can, for example, include but are not limited to one or more of files, folders, directories, meta files or volumes. Support functions can also include conducting caching, error checking or other features in accordance with a particular application.

Transfer manager 111b provides for initiating, via storage controller 111a, the transferring of data by primary storage 111 to another storage device in accordance with one or more applications. Such applications can, for example, include but are not limited to conducting a data backup to another storage device, or in conjunction with transferring data access requests, data storage Ids, other reference information, or data to another storage device. (E.g., see below.) Transfer manager 111b also provides for initiating or conducting, via storage controller 111a, restoration of primary storage data, i.e., or one or more portions thereof, from secondary storage data, Transfer manager 111b, as with storage controller 111a, is operable in response to one or more of requests from application servers, network servers (hereinafter generally included by reference to "network servers") or included application code, e.g., for conducting periodic or other event driven ("triggered") backup, other synchronization or other updating to/from primary storage data. Transfer manager 111b can be configured to operate in response to requests from storage controller 111a to initiate state, controller operation, to operate directly (E.g., see FIG. 7) or can be more or less integrated within storage controller 111a or other system 100 devices, in accordance with a particular application.

(Transfer manager 111b can, for example, temporarily or permanently redirect storage/retrieval data access requests to a secondary storage upon a primary storage data error in accordance with a recoverable or non-recoverable primary storage, transmission media or other error, or otherwise in accordance with a particular application. The secondary storage can respond to such a request via system 100 components that can include primary storage 111 or "directly", i.e., not via primary storage 111. E.g., see discussion below.)

Of the remaining primary storage 111 components, storage media 111c provides the physical media into which data is stored, and can include one or more of hard disks, rewriteable optical or other removable/non-removable media, cache or any other suitable storage media in accordance with a particular application. Other components 111d can, for example, include error checking, caching or other storage or application related components in accordance with a particular application. (Such components are typically implemented in conjunction with mass storage or multiple access storage, such as disk arrays.) Network servers 115 can, for example, include one or more application servers configured in a conventional manner for network server operation (e.g., for conducting network access, email, system administration, and so on).

Finally, secondary storage 116 can include a localized secondary server of the local network comprising subsystem 101, a dedicated storage dedicated to a particular host device, or one or more other storage devices or media in accordance with a particular application.

Note that a disk array or other multiple access storage device is typically used for multiple access applications, such as with the sharing of primary storage 111 by application servers 112a-e, 103, 104 in system 100. In such cases, storage controller 111a can, for example, include any suitable array controller capable of conducting storage array operation as well as data transfers in conjunction with transfer controller 111b. See, for example, FIG. 4.

Application servers 112a-e, 103, 104 provide for user/system processing within system 100 and can include any devices capable of storing data to primary storage 111, or further directing or otherwise interoperating with a primary or secondary storage in accordance with a particular application. Such devices might include one or more of workstations, personal computers ("PCs"), handheld computers, settop boxes, personal data assistants ("PDAs"), personal information managers ("PIMs"), cell phones, controllers, so-called "smart" devices, components thereof or even suitably configured electromechanical devices, among other devices.

Networks 113 and 102 can include static or reconfigurable LANs, WANs, virtual networks (e.g., VPNs), or other wired or wireless interconnections in accordance with a particular application.

Secondary storage 105 provides for storing and managing replicated primary storage data, and can further operate as a dedicated or multiple access storage device either directly or via access redirection by another system 100 component, e.g., more typically by primary storage 111, backup storage 116 or network servers 115. Secondary storage 105 includes storage controller 105a, replication manager 105b, storage media 105c-d and other components 105e.

Generally, a secondary storage can be configured in a similar or the same manner as a primary storage, e.g., including components capable of providing at least a portion of both functionalities, and a system including such devices can be implemented in a static or dynamically reconfigurable manner. A secondary storage can also be configured differently from a primary storage, as with secondary storage 105. Thus, for example, a configuration utilizing secondary storage strictly for backing up or otherwise updating data from or restoring data stored to primary storage 111a might utilize a multiple access storage for primary storage 111 and another suitably configured storage device for secondary storage. A configuration enabling direct or indirect multiple access of secondary storage 105 might use a suitably configured multiple access device, such as a disk array, for secondary storage 111, or other combinable alternatives in accordance with a particular application.

Within secondary storage 105, storage controller 105a provides for conducting storage and retrieval in a similar manner as with storage controller 111a of primary storage 111. Storage controller 105a is also operable for communicating data with replication manager 105b in a similar manner as with storage controller 111a and transfer manager 111b.

Replication manager 105b further provides for storing replicated primary storage 111 data more than once within secondary storage 105, e.g., during a data backup of primary storage 111, and for managing the replicated primary storage 111 data. Secondary storage data sets will also be referred to as a "primary" or "remote" copy (of primary storage data) and one or more "local" or "replicated" copies (of secondary storage data), and can be stored on the same or different physical media.

During an update such as a data backup of primary storage 111 data, for example, replication manager 105b can respond to a storage request via storage controller 105a by causing a primary copy, e.g., 105c, to be stored. Upon substantially complete storage of the primary copy, replication manager 105b can further cause a secondary, local copy of the data to be stored, e.g., 105d, or if an error occurs during storage of the primary copy, then replication manager 105b can avoid storage or further replicating of the replicated copy. Replication manager 105b further maintains a status indicator indicating the status of primary storage data and replicated data (e.g., indicating successful/unsuccessful storage or, for at least a replicated copy, that can further indicate a current or prior update state or a sequence or time/date update indicator of one or more prior updates.) (During a complete backup, for example, transfer manager 105b can store complete primary and replicated copies of primary storage 111 data. During synchronization, transfer manager 105b is configurable for more typically replacing corresponding primary and secondary storage data, or alternatively, separately storing (or further tracking copies of) corresponding data in accordance with a particular application.)

For example, where primary storage 111 and secondary storage 105 include storage arrays for storing shared data, primary storage 111 might store primary volumes (e.g., used as a shared data source shared by application server applications) and secondary volumes used by particular application server applications. In such an example, either or both of primary and secondary volume portions might be similarly or differently updated to secondary storage 105. Using primary volumes as an example, replication manager 105 might first store a remote copy volume 105c and, if stored without apparent error, further replicate a "replicated volume" 105d of the remote copy volume. Replication manager 105b further stores status indicators indicating the status of the replication. Replication manager 105b can also be configured to conduct an update to a further storage from secondary storage 111 in a similar manner.

In this manner, successful remote copy storage enables at least a reliable primary copy (and typically, reliable primary storage 111 data). Further, an unsuccessful remote copy storage (which might also indicate unreliable primary storage 111 data) nevertheless enables previously stored remote copy reliability, and successful storage of remote and replicated copies enables reliable remote and replicated copies. (It will be appreciated that this process can be repeated for applications utilizing more than one remote or replicated copy.)

Replication manager 105b also provides for conducting restoration or other utilization of remote copy or local copy data. In response to a received request for a backup restoration to primary storage 111, for example, replication manager 105b can determine, e.g., by reference to a status indicator, whether the remote copy data has been successfully stored. If so, then replication manager 105b can copy and communicate the remote copy, e.g., via storage controller 105a and network 102, 113, for use by primary storage, and if not, then replication manager 105b can copy and communicate the local copy data. (Note that replication manager 105b can also be configured to communicate an indicator indicating a prior-update status, or prior update data, e.g., for comparison, restoration, distributed processing, and so on, in accordance with a particular application.) Replication manager 105b when configured for conducting alternative primary storage, can similarly cause storage controller 105a to return, to a requesting system 100 component, either or both of remote copy data or local copy data. In a more general case, replication manager 105b can determine whether remote copy data 105c or local copy data 105d has been successfully updated and cause communication of the successfully copied data as with restoration. Replication manager 105b can also be configured to cause only successfully updated local copy data or remote copy to be communicated or to impose a preference for local or remote copy data (e.g., first checking the status of and, if determined to be reliable, causing to be communicated any successfully updated local copy data 105d, and if not successfully updated, then communicating successfully updated remote copy data and/or some version thereof), in accordance with a particular application.

Figure 2:
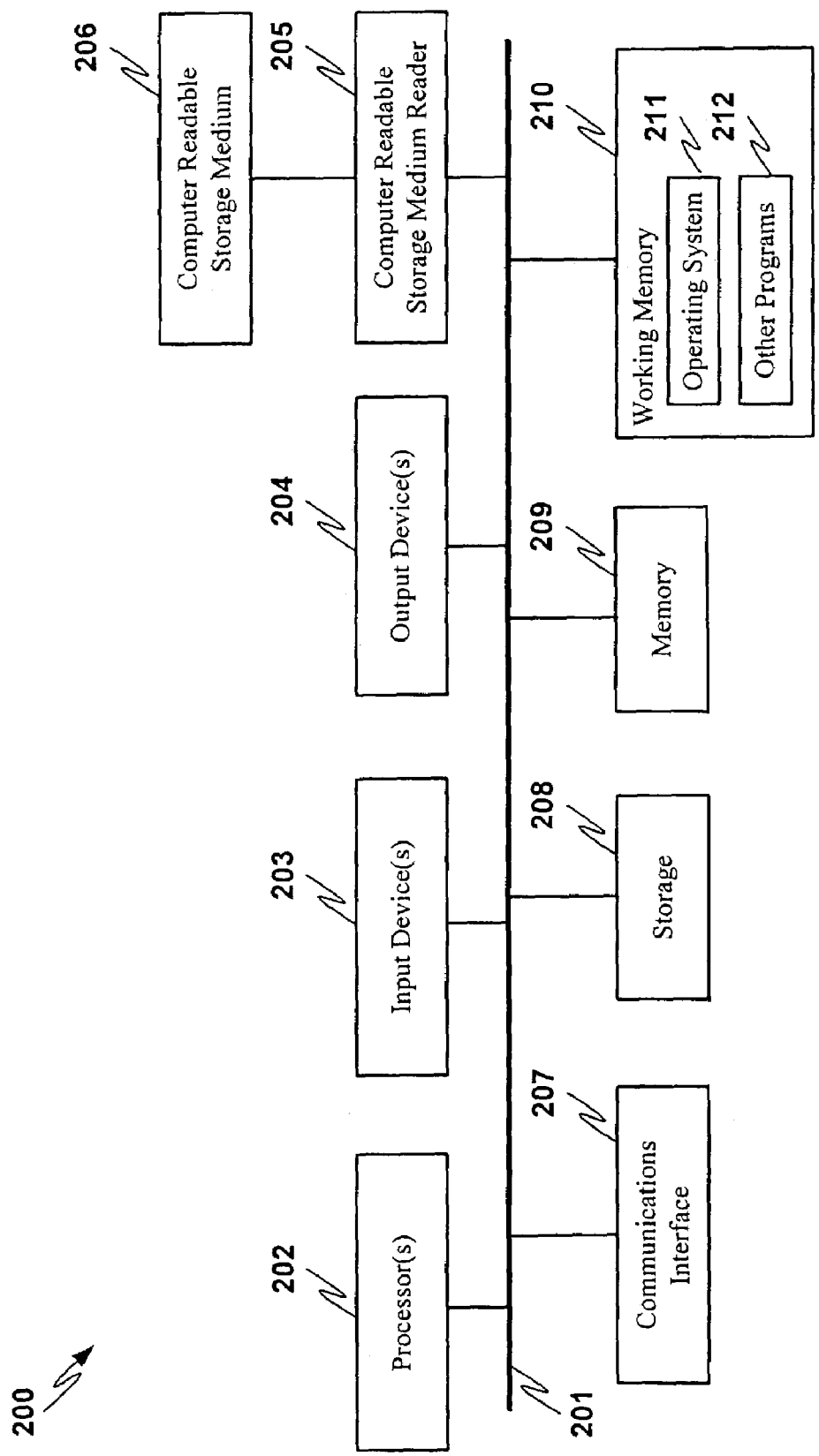
FIG. 2 is a flow diagram illustrating a processing system capable of implementing the data replication system of FIG. 2 or elements thereof, according to an embodiment of the invention.

Turning now to FIG. 2, an exemplary processing system is illustrated that can comprise one or more of the elements of system 100 (FIG. 1). While other alternatives might be utilized, it will be presumed for clarity sake that elements of system 100 are implemented in hardware, software or some combination by one or more processing systems consistent therewith, unless otherwise indicated.

Processing system 200 comprises elements coupled via communication channels (e.g. bus 201) including one or more general or special purpose processors 202, such as a Pentium®, Power PC®, MIPS, StrongARM, digital signal processor ("DSP"), and so on. System 200 elements also include one or more input devices 203 (such as a mouse, keyboard, microphone, pen, etc.), and one or more output devices 204, such as a suitable display, speakers, actuators, etc., in accordance with a particular application.

System 200 also includes a computer readable storage media reader 205 coupled to a computer readable storage medium 206, such as a storage/memory device or hard or removable storage/memory media; such devices or media are further indicated separately as storage device 208 and memory 209, which can include hard disk variants, floppy/compact disk variants, digital versatile disk ("DVD") variants, smart cards, read only memory, random access memory, cache memory, etc., in accordance with a particular application. One or more suitable communication devices 207 can also be included, such as a modem, DSL, infrared or other suitable transceiver, etc. for providing inter-device communication directly or via one or more suitable private or public networks that can include but are not limited to those already discussed.

Working memory 210 (e.g. of memory 209) further includes operating system ("OS") 211 elements and other programs 212, such as application programs, mobile code, data, etc. for implementing system 100 elements that might be stored or loaded therein during use. The particular OS can vary in accordance with a particular device, features or other aspects in accordance with a particular application (e.g. Windows, Mac, Linux, Unix or Palm OS variants, a proprietary OS, etc.). Various programming languages or other tools can also be utilized. It will also be appreciated that working memory 210 contents, broadly given as OS 211 and other programs 212 can vary considerably in accordance with a particular application.

When implemented in software (e.g. as an application program, object, agent, downloadable, servlet, and so on in whole or part), a system 100 element can be communicated transitionally or more persistently from local or remote storage to memory (or cache memory, etc.) for execution, or another suitable mechanism can be utilized, and elements can be implemented in compiled or interpretive form. Input, intermediate or resulting data or functional elements can further reside more transitionally or more persistently in a storage media, cache or other volatile or non-volatile memory, (e.g. storage device 307 or memory 308) in accordance with a particular application.

Figure 3:
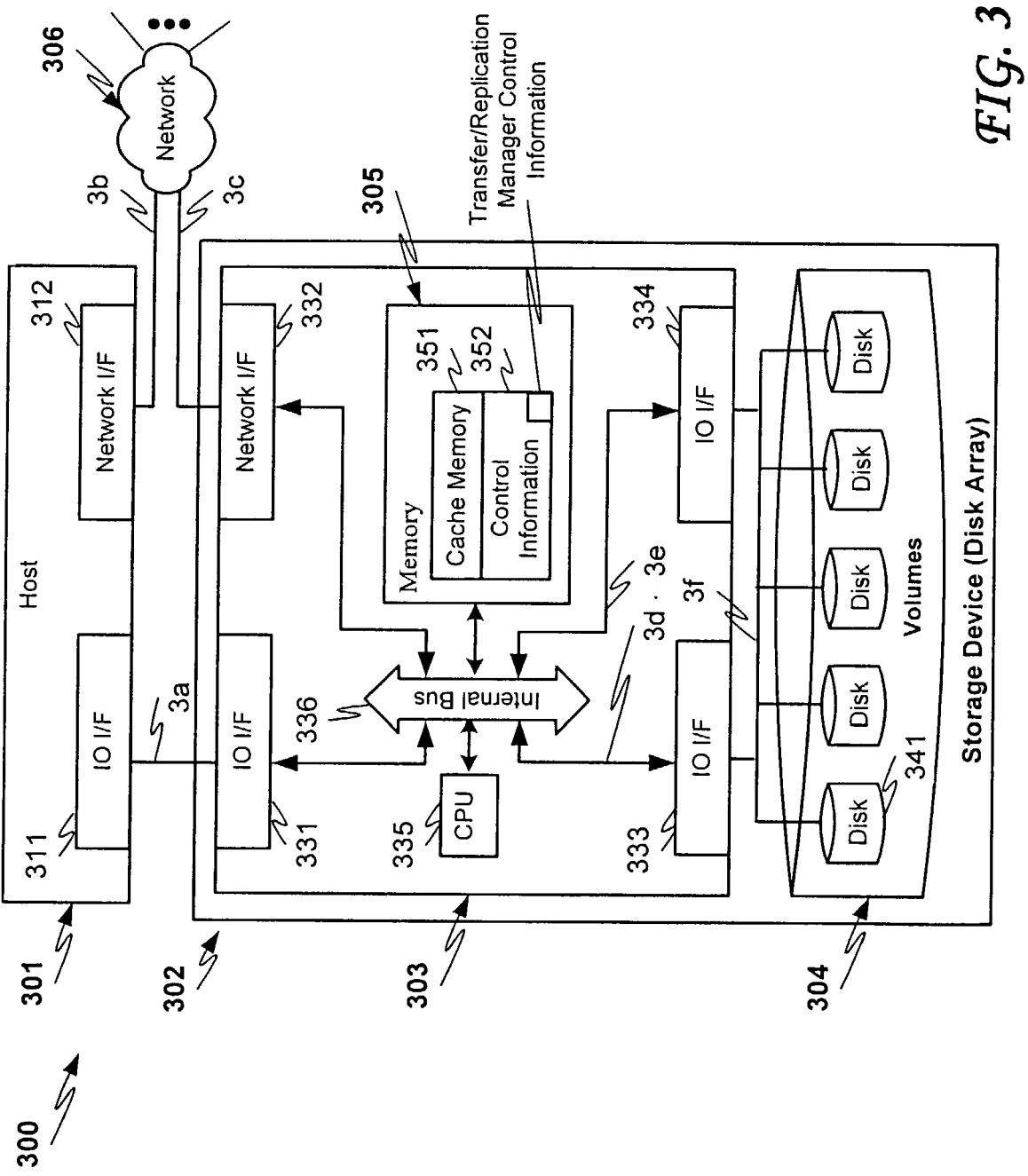
FIG. 3 is a flow diagram illustrating a processor-based replication management system, according to an embodiment of the invention.

The FIG. 3 example illustrates in greater detail how a replication management system 300 can utilize a storage device that is configurable as a primary storage or secondary storage device(s), or can be configurable for operation with or without a host. As shown, system 300 includes host 301, storage device 302 and network 306. Host 301, which can correspond, for example, to system 200 of FIG. 2 or an application server, e.g., 112a of FIG. 1, has been simplified for greater clarity. Storage device 306, which can correspond, for example, to storage 111, 116 or 105 of FIG. 1 or storage 208 of FIG. 2, is illustrated in greater detail.

Host 301 is coupled and issues requests to storage device 302 via corresponding I/O interfaces 311 and 331 respectively, and connection 3a. Connection 3a can, for example, include a small computer system interface ("SCSI"), fiber channel, enterprise system connection ("ESCON"), fiber connectivity ("FICON") or Ethernet, and interface 311 can be configured to implement one or more protocols, such as one or more of SCSI, iSCSI, ESCON, fiber FICON, among others. Host 301 and storage device 302 are also coupled via respective network interfaces 312 and 332, and connections 3b and 3c, to network 306. Such network coupling can, for example, include implementations of one or more of Fibre Channel, Ethernet, Internet protocol ("IP"), or asynchronous transfer mode ("ATM") protocols, among others. Such network coupling enables host 301 and storage device 302 to communicate via network 306 with other devices coupled to network 306. (Interfaces 311, 312, 331, 332, 333 and 334 can, for example, correspond to communications interface 207 of FIG. 2.) Storage device 302 includes, in addition to interfaces 331-334, storage device controller 303 and storage media 304.

Within storage controller 303, CPU 335 operates in conjunction with control information 352 stored in memory 305 and cache memory 351, and via internal bus and the other depicted interconnections for implementing storage control, transfer management and replication management operations. Such operations can, for example, include responding to access requests (i.e., data storage and retrieval), managing storage media 304, and conducting primary storage "remote copy" or secondary storage "replication" operations, such as backing up or restoring backed up data and so on, such as in the above discussed primary and secondary storage examples. Cache memory 351 provides for temporarily storing write data sent from host 101 and read data read by host 301. Cache memory 351 also provides for storing pre-fetched data, such as a sequence of read/write requests or "commands" from host 301.

Storage media 304 is coupled to and communicates with storage device controller 303 via I/O interfaces 333, 304 and connection 3f. Storage media 304 includes an array of hard disks 341 that can be configured as one or more of RAID, just a bunch of disks ("JBOD") or any other suitable static or dynamically reconfigurable configuration in accordance with a particular application. Storage media 304 is more specifically coupled via internal bus 336 and connections 3d-f to CPU 335, which CPU manages portions of the disks as volumes and enables host access to storage media via referenced volumes only (i.e., and not directly to the physical media).

Figure 4:
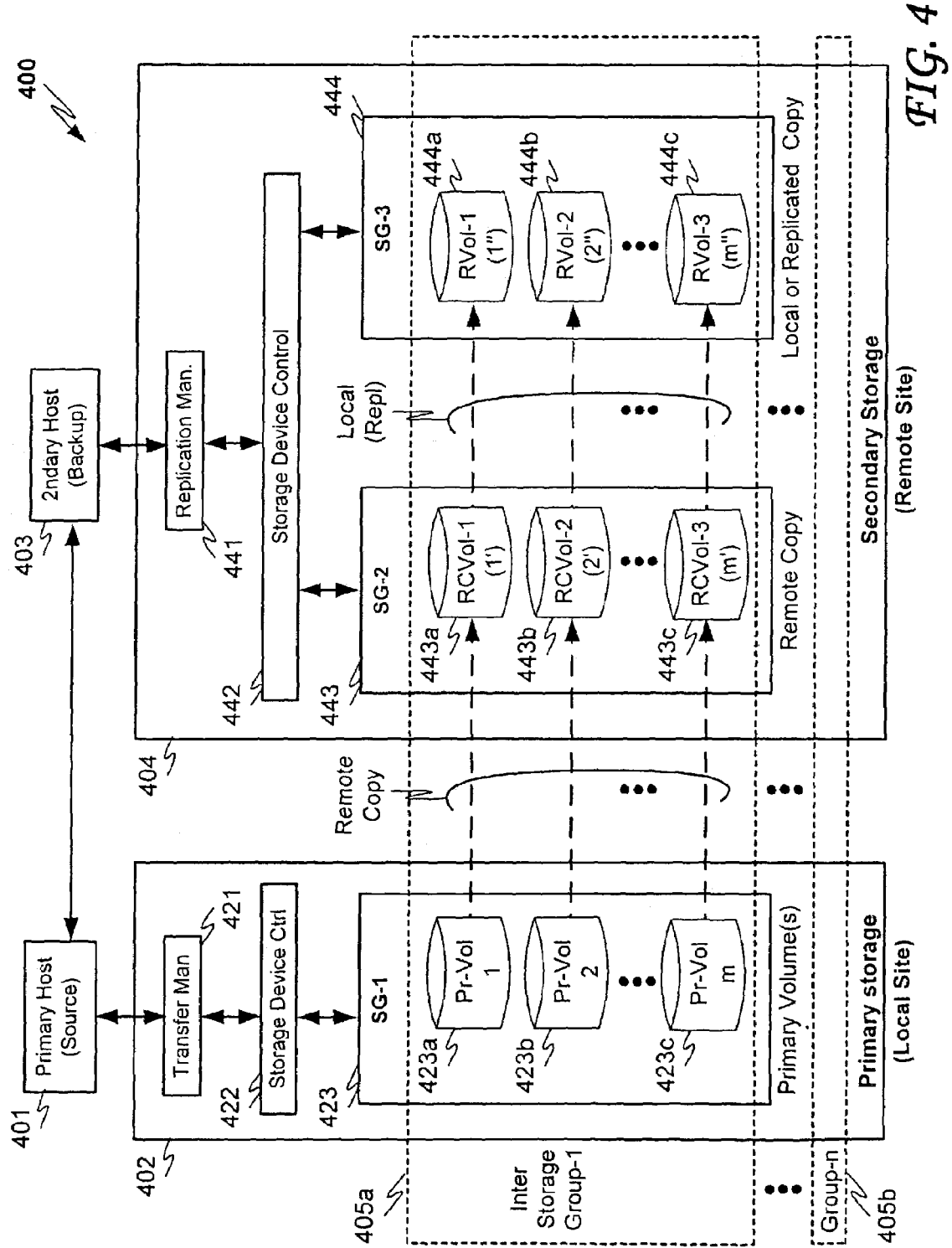
FIG. 4 is a flow diagram illustrating a replication management system configured for performing an update from a primary storage to a secondary storage, according to an embodiment of the invention.

The FIG. 4 flow diagram illustrates a further replication management system 400 utilizing primary and secondary disk arrays, and that further provides for local or inter-storage device data (here, volume) grouping. System 400 includes primary host 401, primary storage 402, secondary host 403 and secondary storage 404.

Primary storage 402 further includes (primary) transfer controller 421, storage device controller 422 and primary volumes 423a-c, indicated as storage group-1 or "SG"-1. Secondary storage 404 includes replication manager 441, (secondary) storage device controller 422 and secondary volumes indicated as storage group-2 443 and storage group-3 444 ("SG-2" and "SG-3"). Each of storage groups 1 through 3 further includes an equivalent number of 1 to m volumes in a first volume inter-storage group 405a and an equivalent number of 1 to n volumes in a second inter-storage group 405b.

(For greater clarity, signal paths are indicated with a solid arrow, while data movement from a source volume to a destination volume in conjunction with a remote copy of primary volume data to secondary storage volume is depicted by dashed arrows.)

Remote copy operations, such as data backups, are typically initiated by transfer manager 421 in accordance with a schedule, security or other triggering event, but might also be initiated by a primary host 401, secondary host 403, network server or even replication manager 441 triggering event, in accordance with a particular application. A network server might, for example, trigger a remote copy by primary storage 402 based on one or more of lesser interconnection traffic, where a coupling interconnection is anticipated to be interrupted at some point or a periodic or other network server schedule, among other examples. It will be appreciated that transfer manager 441 might receive a trigger directly, as depicted, or by monitoring or otherwise via storage device control 422 (e.g., see FIG. 7).

During a triggered secondary storage update, such as a data backup, transfer manager causes a de-coupling of corresponding ones of primary volumes 423 (e.g., see below). Transfer manager 421 further initiates, via storage device control 422, the transfer of all modified or otherwise selected portions of primary volumes 423a-c. Transfer manager 421 transfer primary volume portions via primary host 401 and secondary host 403 to replication manager 441 along with an update, e.g., remote copy, request.

Replication manager 441 responds to the request by causing storage device control 442 to store the copy of the primary volume portion in one or more corresponding second storage group volumes. Thus, in effect, primary volume-1 423*a* data is copied to remote copy volume-1 443*a*, primary volume-2 423*b* data is copied to remote copy volume-1 443*b* and primary volume-m 423*c* data is copied to remote copy volume-m' 443*c*.

Replication manager 441 further, upon successful completion of the remote copy operation (e.g., using one or more of suitable error checking, completion of the remote copy, and so on), causes storage device control 442 to replicate, i.e., copy and store, the remote copies of SG-2 volumes 443 to corresponding local copy volumes or "SG-3" 444. Thus, in effect, remote copy or "RC" volume-1 443*a* data is copied to local copy volume-1 444*a*, RCvolume-2 433*b* data is copied to local copy volume-2 444*b* and RCvolume-m 433*c* data is copied to local copy volume-m 444*c*.

FIGS. 5*a* through 5*f* illustrate an exemplary update sequence in conjunction with a secondary storage update operation initiated, in this example, by a primary storage. (An application server or storage host might also similarly initiate each storage, e.g., by a command or other trigger sent to a primary storage, and so on.) For brevity, only updating of first primary, remote copy and local copy volumes is depicted. It will be appreciated, however, that substantially the same process can be conducted with regard to remaining corresponding volumes or portions thereof. Each step can, for example, be initiated by a transfer manager or replication manager in the manners already discussed with reference to FIG. 4. It will also become apparent that implementations of the sequence can also enable a complete or partial update to be similarly conducted in response to one or more requestor or other triggers. (E.g., see below).

Figure 5A:
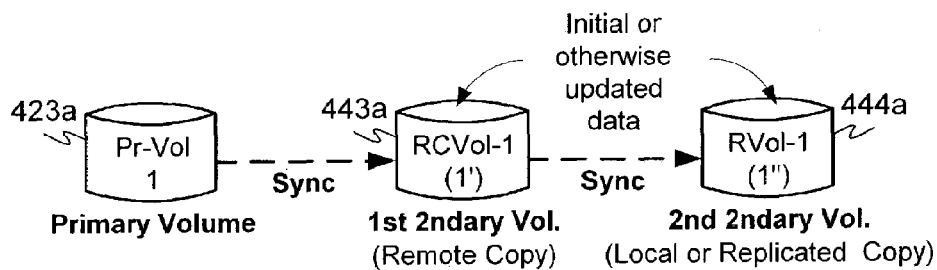
FIGS. 5a through 5f illustrate an update procedure employing replication management, according to an embodiment of the invention.

Beginning with FIG. 5*a*, we assume that a system-wide or "complete" synchronization or re-synchronization state ("sync" or "resync" respectively) exists at some point in time for a system including a primary data storage 423*a* and corresponding first and second secondary storage (443*a*, 444*a*). That is, a sync or resync state exists with respect to each of the "remote copy pair" (including at least one remotely located storage) of primary volume "Pr-Vol1" 423*a* and first secondary volume "RCVol-1" 443*a*, and the "local copy pair" (including only one or more locally located storage) of RCVol-1 443*a* and second secondary volume "Rvol-1" 444*a*.

The "complete" sync or resync of each of the two pairs, for purposes of the present example, results in equivalent data being stored in each of the entirety of volumes 423*a*, 443*a* and 444*a*. It will become apparent, however, that complete sync or resync can be similarly achieved with regard to two or more of other data stores, data store portions or groupings thereof that might be identifiable by name, number, location, type, content or other parameters, in accordance with a particular implementation. (For simplicity, we will assume that remote copy pair 423*a*, 443*a* and local copy pair 443*a*, 444*a* are each in a sync state, as depicted.)

Figure 5B:
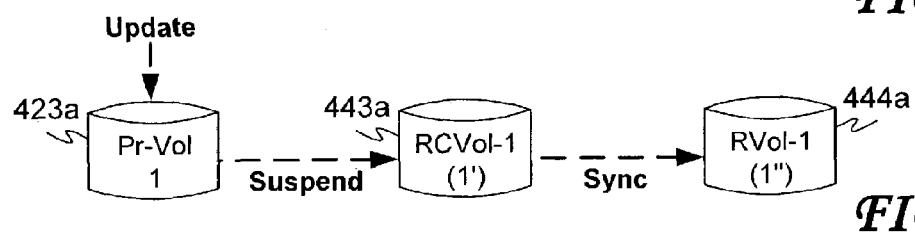

FIG. 5*b* further shows how an initiated remote copy (e.g., triggered by an update of primary volume-1 423*a* or other suitable trigger) causes a modification of the sync state of remote copy pair 423*a*, 443*a* to a suspend synchronizing or "suspend" state. Local copy pair 443*a*, 444*a*, however, remains in a sync state. Primary volume 423*a* further stores reliable current data that is not the same as that stored by local copy pair 443*a* and 444*a*.

Figure 5C:
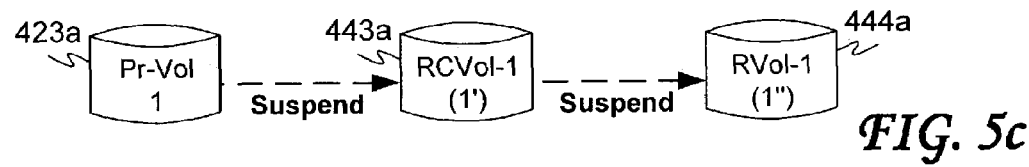

In FIG. 5*c*, local pair 443*a*, 444*a* is also placed in a sync state, e.g., via receipt of a suspend request identifying the local pair or other trigger(s). Note, however, that the data stored by RCvolume-1 443*a* and Rvolume-1 444*a* may nevertheless be equivalent, e.g., due to a prior synchronization or re-synchronization of the pair. Primary volume-1 423*a* continues to store reliable current data.

Figure 5D:
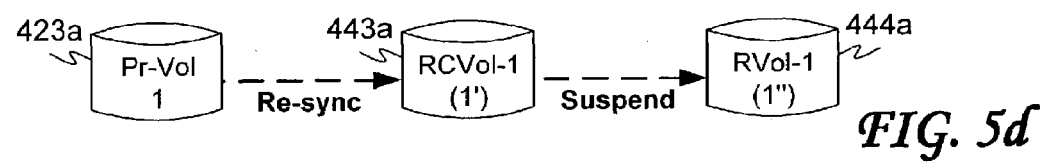

In FIG. 5*d*, initiated re-synchronization, e.g., via application of a resync to remote pair 423*a*, 443*a* causes primary volume-1 423*a* data to be replicated to RCVol-1 443*a*, such that both of volumes 423*a* and 443*a* now contain current and reliable data. However, local copy pair 443*a*, 444*a* remains in a suspend state, such that the data stored by volume 444*a* can be non-equivalent to that stored by remote volume pair 423*a*, 443*a*.

Figure 5E:
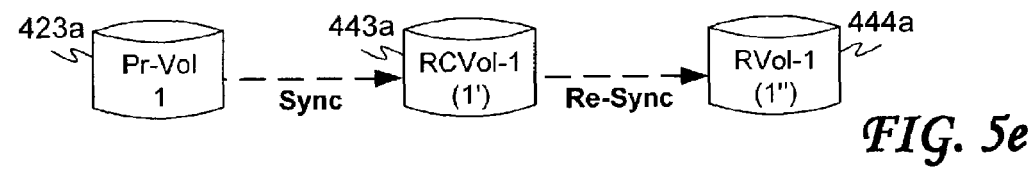
Figure 5F:
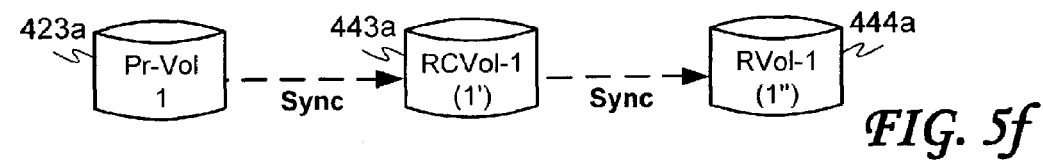

Next, in FIG. 5*e*, a re-synchronization is initiated with regard to local copy pair 443*a*, 444*a*, such that the pair is now in a resync state with each volume storing equivalent current and reliable data. Thus, in FIG. 5*f*, remote pair 423*a*, 443*a* and local pair 443*a*, 444*a* are each in a sync state, and a complete synchronization exists for all three of volumes 423*a*, 443*a* and 444*a*, each of which stores equivalent data. Note how the exemplary sequence of FIGS. 5*a* through 5*c* in effect imposes a timed update rather than the prior-imposed mere updating to single backup storage and according to a fixed sequential update pattern. As a result, the timed update enables at least one reliable data store (here, a volume or volume portion) to be preserved at each step regardless of a system error that might occur. Further, each local copy volume 443*a*, 444*a* will also contain reliable, albeit previous (i.e., not yet updated) data, until initiation of re-synchronization of the remote copy pair causes updating of volume 443*a*, and then initiating of resynchronization of the local copy pair causes updating of volume 444*a*. That is, each storage area update can be timed with respect to the others, and the availability of reliable current (or at least current after the immediately prior or "last" update) data can be assured. Returning to FIG. 4, the number of datasets, (e.g., files, folders, volumes and so on), in a storage system can nevertheless be substantial, thus rendering management of the individual datasets (here, volume portions corresponding to entire volumes) more difficult. Therefore, transfer manager 421 provides for forming local storage groups (e.g., SG-1 through 3) or "inter-storage" dataset groupings, e.g., inter-storage volume group-1 405*a* through volume group-n 405*b*, and for storing indicators indicating the datasets included within each grouping. (See volume-grouping examples below.)

In the depicted configuration, for example, transfer manager 421 can initiate or intercept, from primary host 401 or another application server, an update request otherwise received by storage device controller 422. Transfer manager 421 can further cause storage device controller 422 to issue updates or other operations to volumes indicated by a corresponding volume grouping. Replication manager 441 can similarly cause (secondary) storage device control 442 to operate on remote copy volumes. Replication manager 441 can also cause storage device controller 442 to operate on local copy volumes in similar manners as discussed with regard to update operations above.

Note that system 400 enables virtual dataset references or "IDs", such as volumes or groups of volumes (or volume/group portions), to be maintained in a coordinated manner, with matching references in primary storage 402 and secondary storage 404, or separately. References can, for example, be coordinated in a static manner by similarly initiating primary and secondary storage references, or by transfer manager 421 or replication manager 441 transferring references from one to the another.

References can also be coordinated dynamically, for example, where separate, non-coordinated references are maintained locally by managers 421, 441, and transferred by transfer manager 421 to replication manager 441, e.g., concurrently with re-directing access from primary storage 402 to secondary storage 404, or visa versa. (As with other aspects, such transfer might also be initiated or conducted by an application server in whole or part, in accordance with a particular application.)

Continuing now with further reference to FIGS. 6a and 6b, updating of secondary storage 404 with regard to primary storage 402 modifications, or further complete updating, can be conducted in conjunction with modification indicators, or replication indicators. Beginning with FIG. 6a and FIG. 4, transfer manager 421 maintains a mapping of modification indicators indicating modifications made to storage media tracks or date blocks, or other suitable dataset portions since a last update. During a remote copy, transfer manager 421 accesses the mapping and initiates a transfer of each dataset for which a corresponding modification indicator indicates a corresponding dataset modification.

Thus, for example, transfer manager 421 might respond to a positive or "set" modification indicator for the first (left-most) indicator in modification map 601a by initiating a remote copy of a first block of primary volume-1 423a to secondary storage 402. Transfer manager 421 then clears or "reset" the indicator, resulting in the modification map 601b. Transfer manager 421 would further not initiate a remote copy for a negative modification indicator, and so on for the remaining blocks or other date port is utilized. (The particular mapping/indicators used can, of course, vary.)

Replication manager 441 maintains a replication mapping indicating updated remote copy datasets (of SG-2 443) that have been replicated to corresponding replication datasets (of SG-444). Thus, for example, replication manager 441 might respond to a reset replication indicator for the first (left-most) indicator in modification map 602a by initiating a replication of a first block of remote copy volume-1 443a to a corresponding block of replication volume-1 441a. Replication manager 441 then sets the indicator, resulting in the replication map 602b. Replication manager 441 would initiate a remote copy for a reset replication indicator but not a set replication indicator, and so on, for each of the remaining blocks. (The particular mapping/indicators used can, of course, vary.)

Figure 7A:
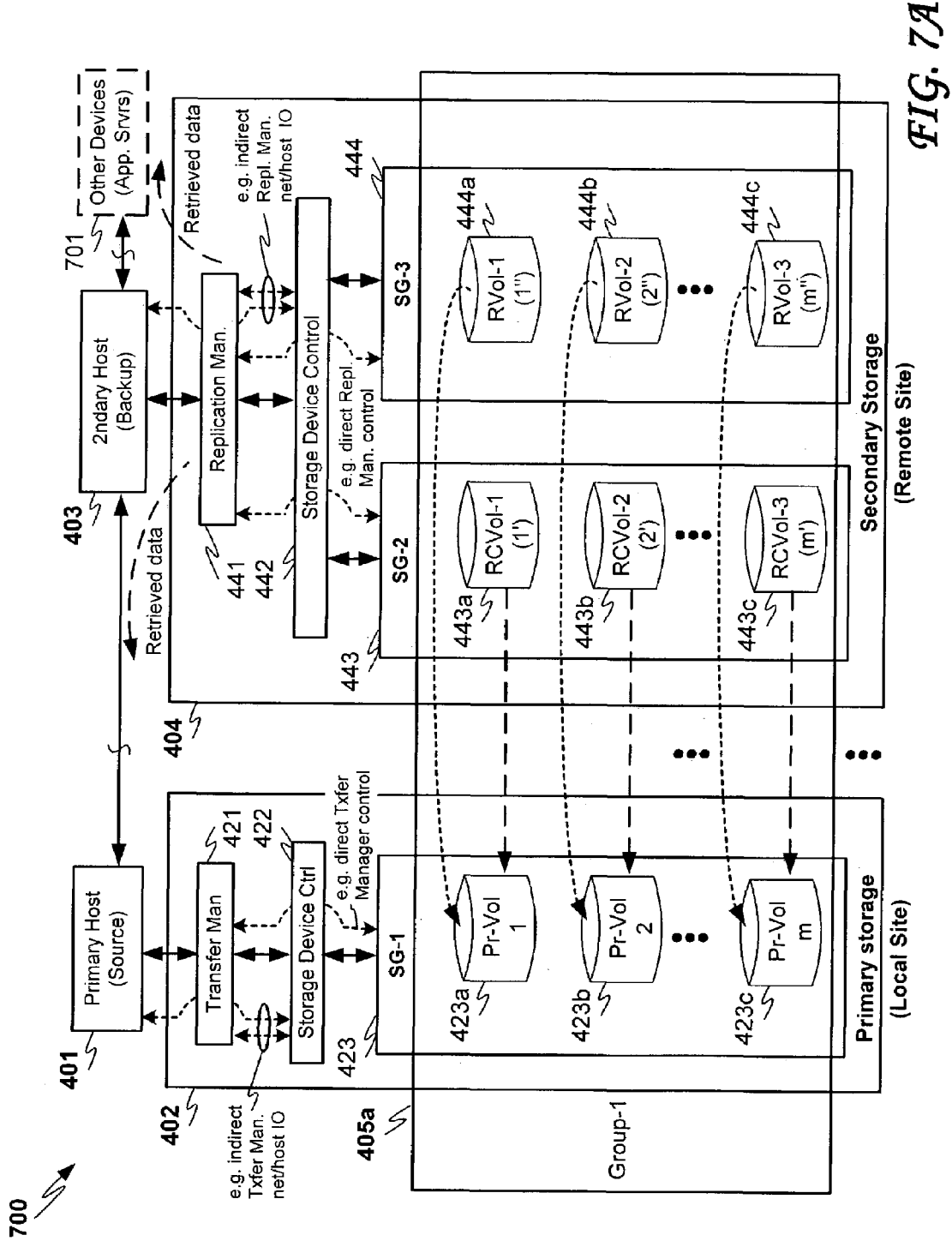
FIG. 7a is a flow diagram illustrating primary storage restoring and direct secondary storage access in conjunction with replication management, according to an embodiment of the invention.

The FIG. 7A flow diagram illustrates an example of how restoration of primary storage data can be conducted in conjunction with a replication management system. As shown, replication manager 421 receives a restore request from transfer manager 421 (or another system 700 component) indicating one or more datasets (here, volumes or volume groups) to restore to primary storage 402.

Replication manager 441 further determines whether to restore corresponding remote copy or replication volumes. As noted above, such determining can be based on one or more of an updated state indicating successful updating, an exclusive preference for one of remote copy volumes and replication volumes, a first preference for one of remote copy volumes or local copy volumes, or other criteria in accordance with a particular application. Following such determining, replication manager transfers to primary storage 402 the corresponding volumes or volume groups. (A group implementation can utilize direct grouping control, i.e., affecting the whole or some portion of the group, or successive control of individual volumes or other applicable datasets.)

FIG. 7A also shows an example of how direct accessing of secondary storage data can be conducted in conjunction with a replication management system in a similar manner as with restoring. In this example, replication manager 421 receives a read request from one of application servers or other devices 701 (or another system 700 component) indicating one or more datasets (here, volumes) or volume groups to be read. Replication manager 441 further determines whether to access corresponding remote copy or local copy volumes, for example, in a similar manner as with the above restoring. Following such determining, replication manager 421 transfers to the requesting device the corresponding volume(s) or volume group(s).

As noted above, data write operations can also be conducted on one of the remote copy or local copy volumes while leaving the other intact. A bi-directional updating might further be conducted including a "reverse updating" from secondary storage 404 to primary storage 402. It will be appreciated, however, that a more complex system would result in which synchronization of both primary and secondary storage data might be necessitated. (Suitable conventional or other synchronization conflict resolution could, for example, be used in such cases in accordance with a particular implementation.)

Figure 7B:
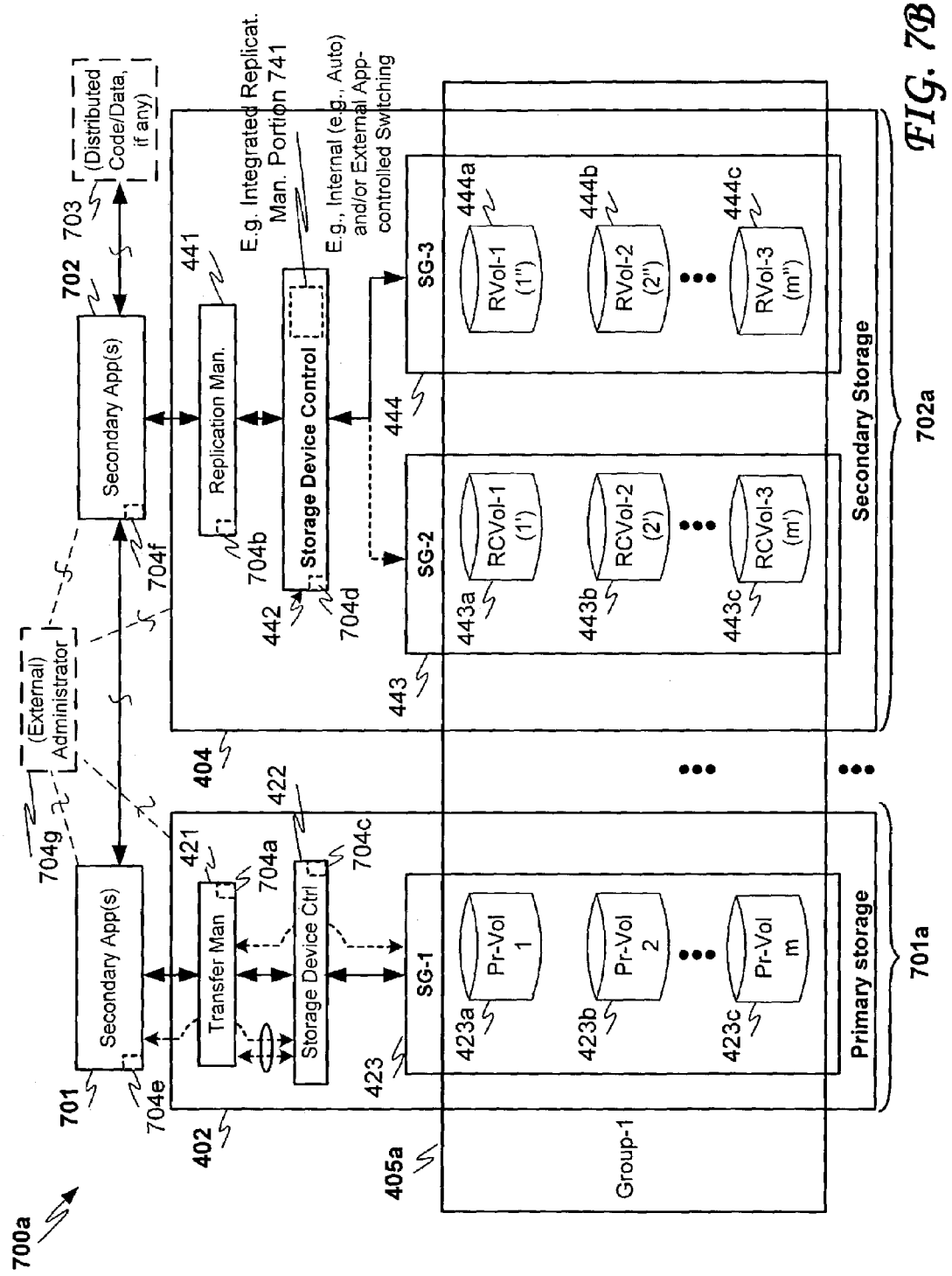
FIG. 7b is a flow diagram illustrating examples of enabled alternating secondary storage portion utilization under internal and/or external application control, of partial or complete replication manager integration within a storage control functionality, and of distributed storage utilization control, one or more of which might be used in accordance with a particular application.

FIG. 7B shows an example of recovery at a secondary site. In this example, one or more secondary applications 702 take over for one or more primary applications 703 at a primary site 701a, when failure occurs at the primary site storage, host or both). An administrator, which can reside in one or more of transfer manager 421, replication manager 441, storage device controls 422, 442, primary/secondary hosts or an external (e.g., system monitoring/control) server, detects the error and issues a "takeover" command to secondary storage 404. Replication manager 441, which receives the command, splits the remote copy pair between SG-1 and SG-2. Storage device control 442 further selects, from SG-2 and SG-3, at least one SG to be attached, based on a control process/parameters, such as in the example shown in FIG. 16. Storage device control assigns and communicates to the host an ID and a physical port corresponding to each accessible volume, e.g., based on the table shown in FIG. 11. Secondary applications 702 can then access the selected SG, which SG is in a state consistent with SG-1, without any further operation, e.g., inquiry, transfer, and so on.

It will be appreciated that error detection can be conducted via one or more of error state transmission or "reporting" by an affected device, polling, monitoring or observed unresponsiveness of the device, device activity or data by another local or remote device, and so on. It will further be appreciated that the invention enables other recovery in which, for example, error detection, security or other initiating triggers and subsequent taking over or "redirection" can be conducted in a similar manner with regard to utilization of one or more secondary site data stores, code, portions/groups thereof or some combination. (Some modification may, however, be required with regard to specification of data, application code, specific data stores, groups or portions, triggering parameters, and so on, e.g., within commands, references or administrator or other code. However, those skilled in the art will appreciate that the invention enables similar if not the same operation in each case, and facilitates various alternatives as well.)

Figure 8:
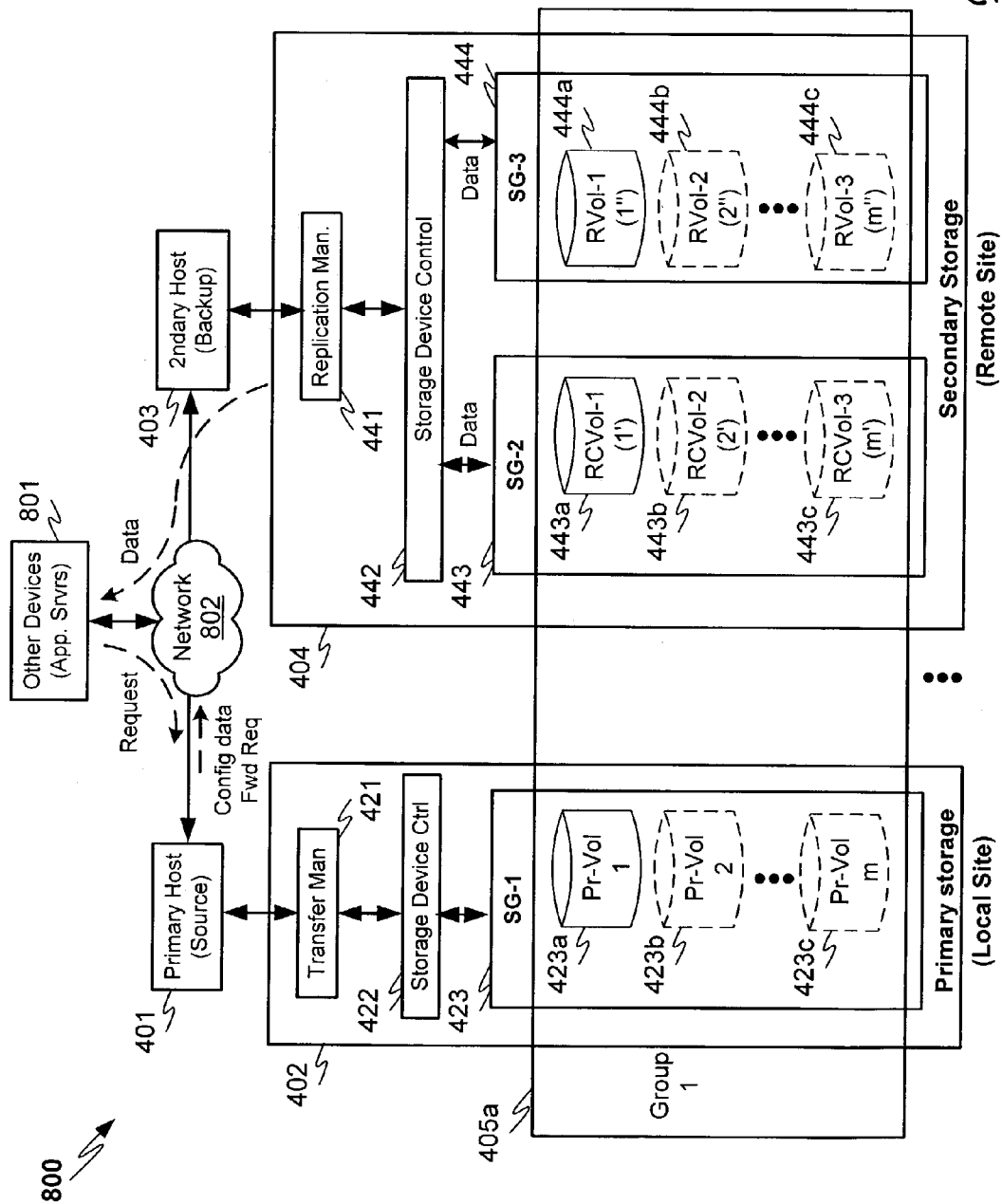
FIG. 8 is a flow diagram illustrating redirected primary storage access in conjunction with replication management, according to an embodiment of the invention.

FIG. 8 shows an example of how diverted accessing from a primary storage to a secondary storage can be conducted in conjunction with a replication management system in a similar manner as with the restoring or direct accessing of FIGS. 7a-b. Redirected access might, for example, be conducted where a primary storage media has become damaged or primary data has otherwise become corrupted.

Transfer manager 421 might initiate the diverted access, or primary host 401 or another system component might receive from transfer manager 421 volume or grouping data, one or more indicators indicating one or more corresponding secondary storage devices or other configuration data and conduct the access, and so on in accordance with a particular application. For clarity sake, we will assume that transfer manager 421 initiates the redirected access. (It will be appreciated, however, that, other than a specific mechanism for transferring configuration data prior to the diverting, the operation is similar when conducted by other system components.)

As shown, transfer manager 421 receives a read/write request from one of application servers or other devices 801 (or another system 800 component) indicating one or more datasets (here, volumes or volume groups) to be accessed. Assuming that non-corresponding dataset references are used by primary storage 402 and secondary storage 404, transfer manager 421 transfers such references to secondary storage 402, and replication manager 441 creates a mapping between primary storage and secondary storage references. This enables the access request to remain unchanged despite the diversion to a secondary storage that employs non-corresponding references. Transfer manager 421 further transfers the request to secondary storage.

Replication manager 441 determines whether to access corresponding remote copy or replication volumes, for example, in a similar manner as with the above direct accessing. Following such determining, replication manager 421 transfers to the requesting device the corresponding volume(s) or volume group(s) data for a retrieval, or conversely, receives and stores the requesting device data for a data storage.

Figure 9A:
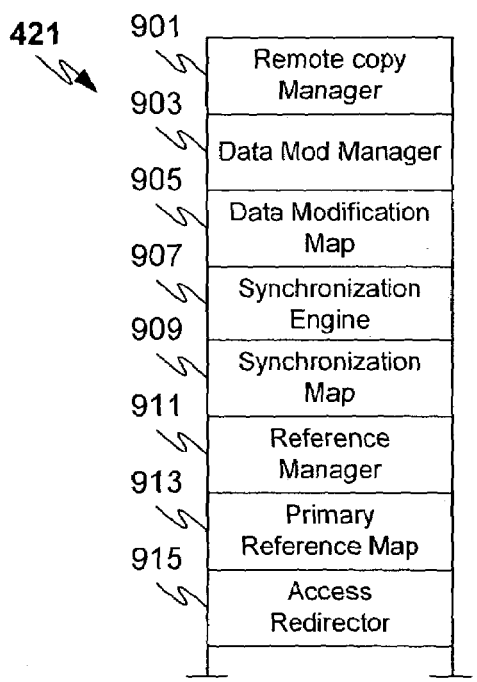
FIG. 9a illustrates, in greater detail, an example of the transfer manager of FIG. 4, according to an embodiment of the invention.
Figure 9B:
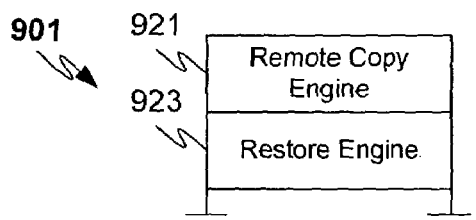
FIG. 9b illustrates, in greater detail, an example of the remote copy manager of FIG. 9a, according to an embodiment of the invention.

FIGS. 9a and 9b illustrate an exemplary implementation of transfer manager 421 of FIG. 4. Within transfer engine 421, remote copy engine 901 provides for conducting remote copy and restore operations, and includes a remote copy engine 921 and a restore engine 923 (FIG. 9b). Prior to a remote copy operation, remote copy engine 921 initiates data modification manager 903, which tracks modifications to predetermined datasets or data groups by storing indicators of such modifications in data modification map 905. Data modification map 905 includes an indicator for each data block of the predetermined dataset(s) or data group(s). Initially, data modification manager 903 resets all data indicators to indicate that none of the blocks have been modified. Data modification manager 903 then sets a modification indicator as a corresponding data block is modified, e.g., as depicted in FIG. 6a. (Other dataset portions might similarly be tracked in a static or dynamic manner, e.g., tracks, sectors, and so on, in accordance with one or more of facilitating common data referencing, performance optimization or other implementation requirements.

During a remote copy, remote copy engine 921 initiates data modification manager 903, which successively polls the block indicators in data modification map 905 and returns to remote copy engine 921 modification determination indicating whether a corresponding block has been modified. If so, then synchronization engine 907 is initiated by remote copy engine 921 to issue a split command to a storage controller, thereby isolating the primary storage data. Sync engine 907 further stores the state of primary storage as a sync state indicator 909. Remote copy engine 921 still further initiates reference manager 911, which uses reference map 913 to determine a corresponding data address. (An exemplary primary reference or "ID" map is shown in FIG. 11a.)

Remote copy engine 921 then issues a transfer request including the corresponding data address to a storage controller, which causes the corresponding data to be transferred to a secondary storage. (Where more than one secondary storage is used, transfer engine 900 can, for example, also include additional secondary storage identification information.) Remote copy engine 921 further initiates modification manager 903 to clear the corresponding data modification indicator in modification map 905. This process is then repeated until all of the corresponding modified data has been transferred, unless interrupted by a system error, in which case, operation might cease, error handling might be initiated, and so on, in accordance with a particular application. Remote copy engine then initiates synchronization engine 907 to issue a synchronization command to the storage controller, thereby releasing the primary storage data for further access by system components.

During a restore operation, restore engine 923 initiates a request to the secondary storage to transfer data that will replace predetermined primary storage data ("predetermined" state or as e.g., indicated in the request). Upon receipt of such data from the secondary storage, restore engine 923 initiates reference manager 911, which uses reference map 913 to determine a corresponding secondary storage data address and issues successive write requests, including the respective addresses, to the storage controller, which conducts the replacing of the primary storage data with the received secondary storage data.

During a redirection operation conducted by transfer engine 900, remote copy manager 901 initiates access redirector 915. Assuming that non-corresponding references are used for primary and secondary storage or that dynamic references are used, access redirector 915 initiates reference manager 911, which returns to access redirector reference data 913; access redirector 915 further returns the reference data to remote copy manager 901, which initiates transfer of the reference data 913 to the secondary storage.

Figure 10A:
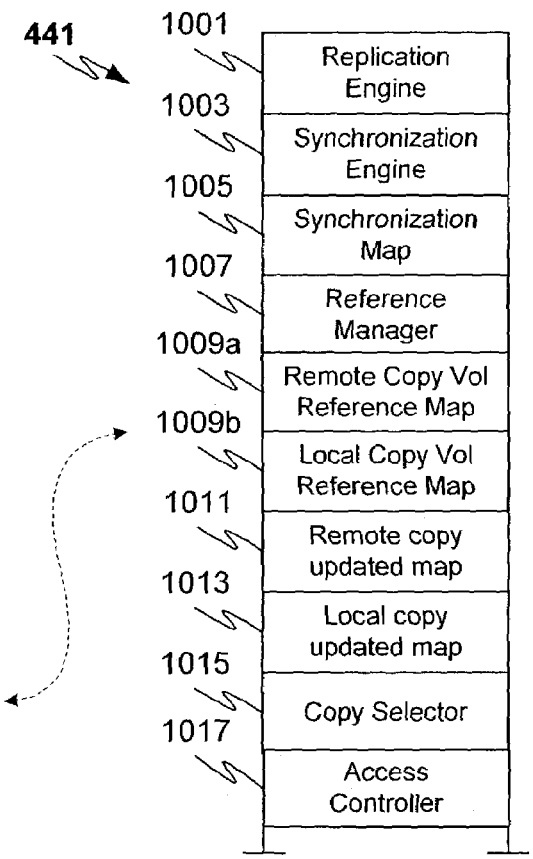
FIG. 10a illustrates, in greater detail, an example of the replication manager of FIG. 4, according to an embodiment of the invention.
Figure 10B:
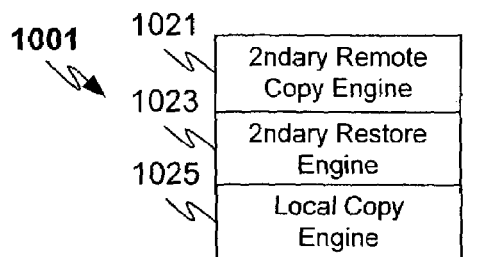
FIG. 10b illustrates, in greater detail, an example of the replication engine of FIG. 10a, according to an embodiment of the invention.
Figures 12, 13:
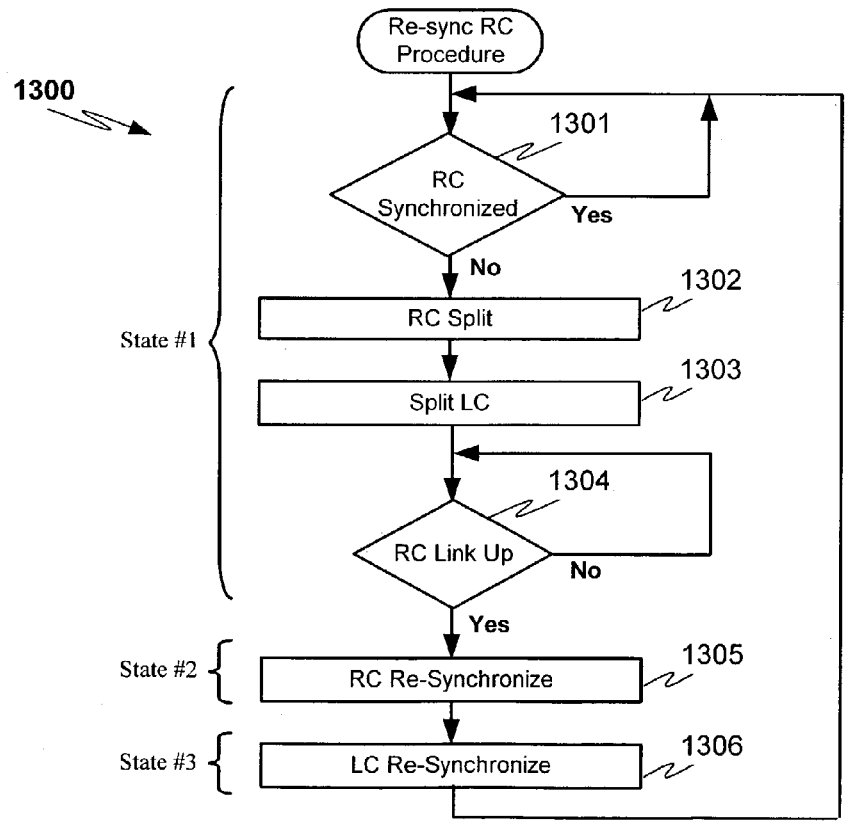
FIG. 12 illustrates a status mapping according to an embodiment of the invention.
FIG. 13 illustrates a secondary storage state management method according to an embodiment of the invention.

FIGS. 10a and 10b illustrate an exemplary implementation of replication manager 441 of FIG. 4. Within replication manager 441, replication engine 1001 provides for conducting secondary storage remote copy, local copy and restore operations, and includes a remote copy engine 1021, local copy engine 1023 and a restore engine 1025 (FIG. 10b). During a remote copy operation, (secondary) remote copy engine 1021 responds to a remote copy request from a primary storage by initiating synchronization engine 1003. Synchronization engine 1003 issues a remote copy split command to a storage controller, thereby isolating the remote copy storage, and stores the state of the remote copy storage in synchronization or "sync" map 1005. (An example of a sync map is shown in FIG. 12.) Local copy engine 1023 further initializes a remote copy update map 1005 that includes indicators for indicating updates made to remote copy data.

If the primary and secondary storage references are non-corresponding, then remote copy engine 1021 further initiates reference manager 1007, which uses remote copy reference map 1009a to determine a corresponding secondary storage data address. (An example of a remote copy reference or "ID" map is shown in FIG. 11b.) Otherwise, a remote copy reference provided in the received command can be used. Remote copy engine 1021 then issues a request to the storage controller to store the received data according to the remote copy reference utilized, thereby replacing the corresponding remote copy data. Remote copy engine 1021 further sets a remote copy update indicator in remote copy update map 1011 to indicate that the remote copy data has been updated. The reference determining, storage request and indicating are then repeated for further received update data, unless interrupted by a system error, in which case the operation might cease, error handling might be initiated, and so on, in accordance with a particular application.

After completion of remote copy updating remote copy engine 1021 initiates local copy engine 1023. Local copy engine 1023 initiates synchronization engine 1003, which issues a local copy split command to a storage controller, thereby isolating the local-copy storage, and further stores the state of the remote copy storage in synchronization map 1005. Local copy engine 1023 also initializes (e.g., resets all entries in) a local copy update map 1013 including indicators for indicating updates made to local copy data.

Local copy engine 1023 then causes updated remote copy data to sequentially replace corresponding local copy data. Alternatively stated, local copy engine 1023 replicates any updates of remote copy data to corresponding local copy data. Local copy engine 1023 polls the remote copy update map to determine a first remote copy indicator that has been set, if any, indicating an update to remote copy data. If an indicator is set, then local copy engine 1023 initiates reference manager 1007, which determines from local copy reference map 1009*b* (e.g., FIG. 11*c*) the address of the corresponding local copy data. Local copy engine then issues to the storage controller a copy request including the determined data reference, thus causing the corresponding local copy data to be replaced. Local copy engine 1023 then updates local copy map 1013 (e.g., setting the corresponding local copy map indicator) to indicate that the update is completed. Local copy engine 1023 then continues the replicating with respect to other data blocks indicated by remote copy map 1011, unless the process is interrupted by a system error, in which case the process ceases. Otherwise, the process continues to completion and local copy manager initiates synchronization manager 1003 to change the remote and local copy storage states to "synchronized".

During a restore operation, restore engine 1025 receives a restore request from a primary storage indicating primary data or data groups to be restored. Restore engine 1025 responds by initiating copy selector 1015. Copy selector 1015 determines, based on predetermined copy selection criteria (e.g., see FIG. 7 discussion above) whether remote copy or local copy data is to be restored to the primary storage, and returns to restore engine 1025 the determination.

Then, for each volume or other dataset, restore engine 1025 first initiates reference manager 1007. Reference engine 1007 then polls reference map 1009 to determine the dataset reference and returns the reference to restore engine, which issues a read request to the storage controller including the reference and a primary storage reference, thereby causing the data to be restored to the primary storage.

During a redirection operation, replication engine 1001 responds to a write primary reference map request, where the primary and secondary storage are not coordinated or dynamic referencing is provided, by initiating (secondary storage) reference manager 1007. Reference manager 1007 responds by storing the primary reference map. Replication engine 1001 further responds to a read request by initiating access controller 1117. Access controller 1117 initiates copy selector 1115, which determines, based on predetermined copy selection criteria (e.g., see FIG. 8 discussion above) whether remote copy or local copy data is to be restored to the primary storage, and returns to access controller 1117 the determination.

Then, for each volume, group or other dataset, access controller 1025 first initiates reference manager 1007. If a primary reference map has been received that corresponding to the read request, then reference manager 1007 determines a correspondence between the primary dataset reference and the secondary storage dataset reference stored in reference map 1009*a* or 1009*b*, depending on the selection determination respectively of a remote copy or local copy dataset. Otherwise, reference manager 1007 polls the reference map (1009*a* or 1009*b* depending on the selection determination) to further determine the dataset reference. Reference manager 1007 in either case returns the resultant secondary storage reference to access controller 1025, which issues a read request to the storage controller including the reference and a requesting device reference, thereby causing the data to be returned to the requesting device.

FIGS. 11*a* through 11*c* illustrate exemplary reference maps respectively for primary storage group (SG-1) 423, remote copy storage group (SG-2) 443 and local storage group (SG-1) 423, SG-2 443 and SG-3 444 of system 400 (FIG. 4). It should be noted that such mappings can be almost the same, except for the particular storage group referenced by a given mapping.

A storage system employing replication management can have associated with it various sets 1102*a* of information that can reference inter-storage groups of volumes 1101*a-c*, and can further be preset or indicated in a storage access command, such as an access request. In the present example, each set 1102*a-c* can include a port reference 1103*a* and ID 1104*a-c* reference per volume 1101*a-c*. Ports 803*a-c* reference a physical port of a storage system, such as SG-1 through SG-3. Each volume 1101*a-c* is assigned to the physical port 1103*a-c* which is addressable on a storage I/O interface (e.g., IO I/F 331 of FIG. 3) when a volume is accessed from a host (e.g., host 301). Each volume is also assigned a unique ID 1104*a-c*, for example a WWN reference for fiber channel, a SCSI name for iSCSI, and so on.

Management of the storage system on a per system group basis facilitates management as compared with per volume management, and further facilitates scripting of storage system management functions. Examples of applicable commands include an attach command for attaching a storage volume group ("SG") to a port as one of a set; a detach command for detaching an SG from a port and preventing host accessing of the SG; a split command for accessing an SG without synchronizing with other SGs (e.g., primary storage volumes with remote copy volumes or remote copy volumes with local copy volumes); a re-sync command for re-synchronizing SGs (e.g., primary volumes with remote copy volumes); a switch command for switching ID references from one set to another; or a migrate command, for enabling SGs to share an ID mapping and thus operate as one another.

The exemplary status map of FIG. 12 further enables single state reference 1201 to the combined states of multiple SGs, such as a remote copy volume 1202 and a local copy volume 1203, and an apparent "best" source of reliable data based on that combination that should be attached for reliable data access 1204. State 1 is an initial state, e.g., corresponding to FIGS. 5*a*, 5*b*, 5*c* and 5*f*, in which both of remote copy and local volumes are synchronized and suspended, and contain reliable data. State 2 corresponds with FIG. 5*d*, in which the remote copy is being re-synchronized with the primary volume and may contain unreliable or "inconsistent" data, while the local copy volume, which is synchronized and suspended, is detached from the remote copy and contains reliable data. Thus, an access should be directed to the reliable local copy data of SG-3. State 3 corresponds with FIG. 5e, in which a local copy volume is being re-synchronized with a remote copy volume and is unreliable, while the already re-synchronized remote copy volume data (SG-3) is reliable and should instead be accessed.

FIG. 13 illustrates an exemplary status management method that is capable of utilizing the three states discussed with reference to FIG. 12. State 1 corresponds with steps 1301 through 1304, state 2 corresponds with step 1305 and state 3 corresponds with step 1306.

In step 1301, the status of the remote copy of one or more inter-storage volume groups, e.g., groups 405a-b of FIG. 4) and typically all such groups are checked on a periodic, potential error or other event triggered basis, as state 1 should be maintained as long as the secondary storage remote copy and local copy storage pair is coupled. In step 1302, the remote copy (SG-2) is split and the remote copy is suspended. In step 1303, the local copy (SG-3) is split, such that remote copy data and local copy data are isolated from one another. In step 304 the status of the remote copy storage group is again checked on a periodic or other event triggered basis to determine if the remote copy and can again be linked to the primary storage group (SG-1). A failure of a host to update the respective primary storage and remote copy storage group indicates a lack of data requiring re-synchronization.

Next, in step 1305, the remote copy storage group linking with the primary storage indicates the start of remote copy re-synchronization, such that the remote copy data may not be reliable. Finally, in step 1306, remote copy re-synchronization is completed and re-synchronization of the local copy data is initiated, such that the local copy data may not be reliable. Upon completion of the re-synchronization, however, both of the remote copy and local copy data is synchronized and should be reliable.

Figure 14:
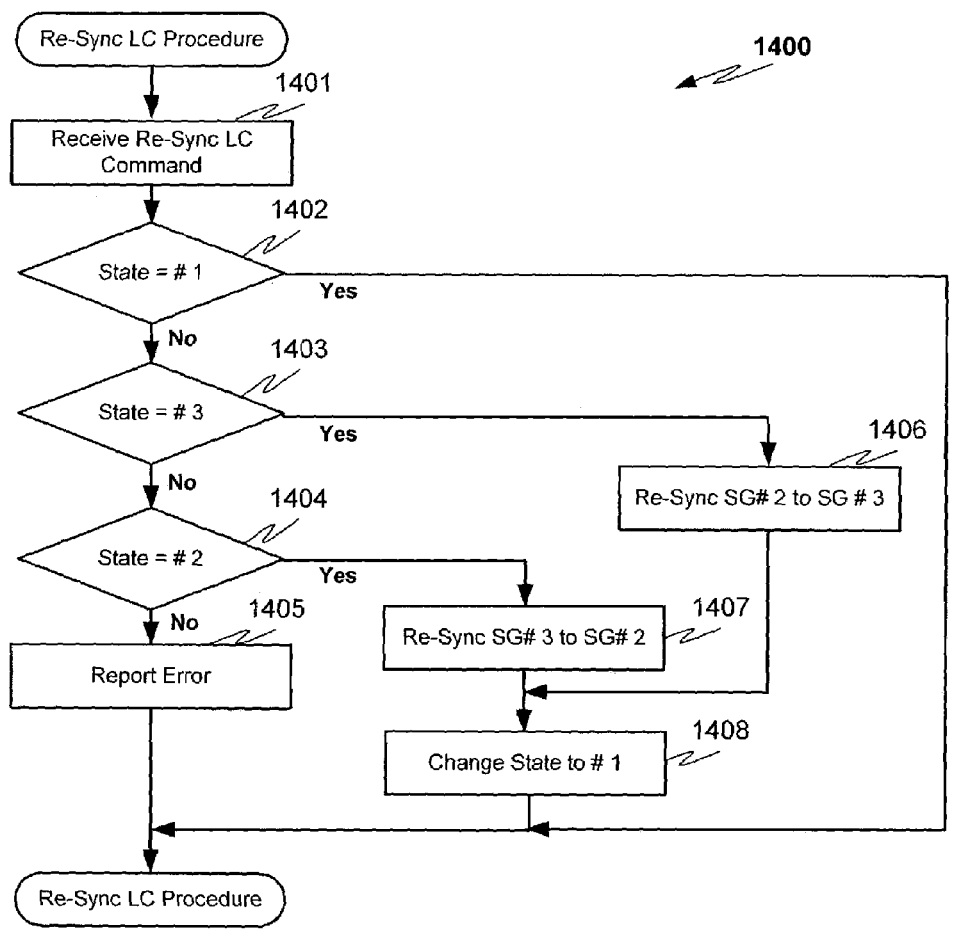
FIG. 14 illustrates a local copy re-synchronization method according to an embodiment of the invention.

FIG. 14 illustrates an exemplary local copy re-synchronization method that is capable of utilizing the three states discussed with reference to FIG. 12. As shown, in step 1401, a re-synchronize local copy command is received. If, in step 1402, the current state is state 1 (and the local copy pair is synchronized), then no action is required. If instead, in step 1403, the current state is state 3, then the local copy volume group contains "old" data. Therefore, re-synchronization from remote copy data to local copy data is initiated in step 1406. (As discussed above, the remote copy data should be reliable and should be attached to the host). However, upon completion of the re-synchronization, the remote and local copy data are in sync, and the state is changed to state 1 in step 1408. In step 1404, if the current state is state 2, then remote copy data should be old and the remote copy pair should be re-synchronized (step 1407). However, the local copy data, which should be reliable, should be attached to the host. Then, upon completion of the re-synchronization, the remote copy and local copy (or local copy pair) should be in sync and the state should be changed to state 1 in step 1408. If, in step 1405, the current state is not one of states 1 through 3, then an error has occurred and can be reported to an error handling procedure or user.

Figure 15:
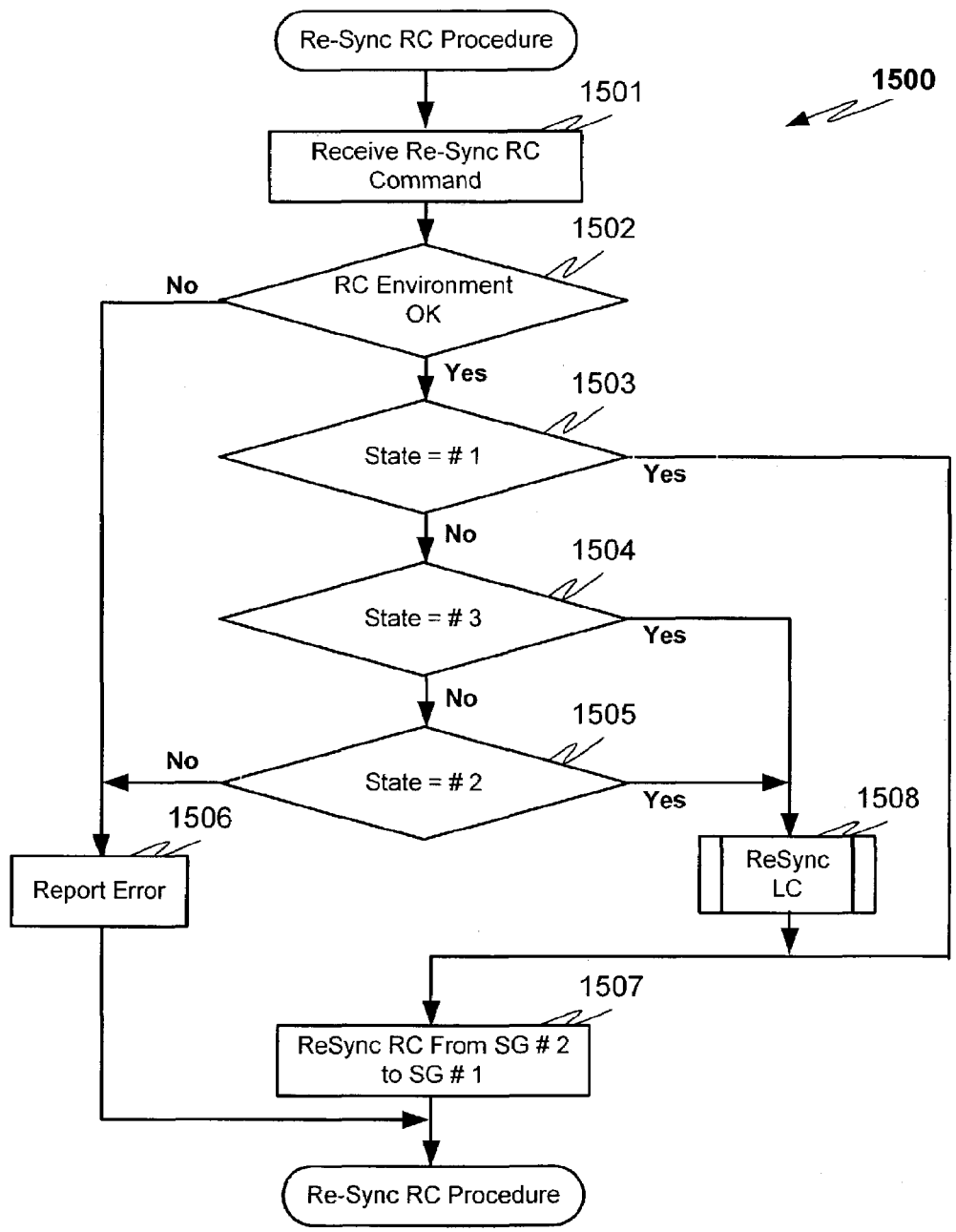
FIG. 15 illustrates a remote copy re-synchronization method according to an embodiment of the invention.

FIG. 15 illustrates an exemplary remote copy re-synchronization method that is capable of utilizing the three states discussed with reference to FIG. 12. As shown, in step 1501, a re-synchronize remote copy command is received. In step 1502, it is determined whether the remote copy environment is operable, for example, by attempting to link the remote copy data with the primary data. If unsuccessful, in step 1506, an error has occurred and is reported. If, in step 1503, the environment is operable and the current state is state 1, then re-synchronization of the remote copy data from the remote copy to the primary storage should be initiated in step 507. If instead the environment is operable but the current state is state 2 or state 3 (steps 1504, 1505, then the local copy is re-synchronized in step 1508, and the remote copy data is re-synchronized from the remote copy to the primary storage in step 1507.

The FIG. 16 flow diagram illustrates an exemplary attach procedure that can, for example, be used in conjunction with the attaching and isolating or "splitting" discussed with reference to FIG. 7b or otherwise in accordance with a particular application. As discussed above, embodiments of the invention enable all or part of the FIG. 16 procedure to be conducted from within a disk array or other storage, by a suitable host, by a system administrator, or some combination, using local or remotely executable code that is pre-loaded or loaded/executed as needed. Note also that, for consistency, a three SG system having primary, first secondary and second secondary SGs 1-3 is again presumed for the present example (e.g., see FIGS. 7a-b).

Figure 16:
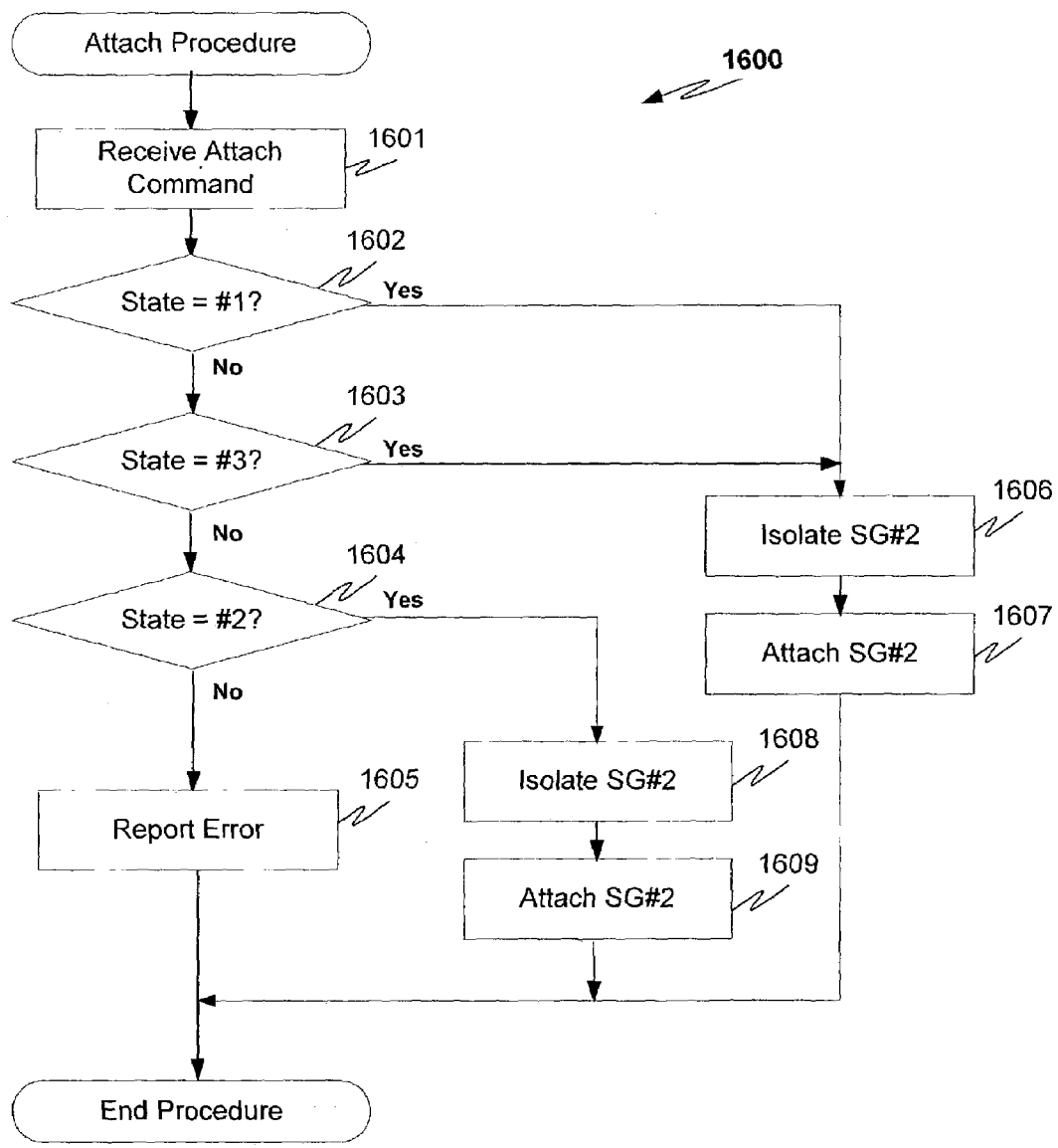
FIG. 16 is a flow diagram illustrating an attach procedure, according to an embodiment of the invention.

FIG. 16 shows how, in step 1601, the procedure starts with receipt of an attach command. (It will be appreciated, however, that the procedure might also be initiated by one or more other triggers, including but not limited to receipt of an error condition indicator.) In steps 1602 and 1603, when the state (see FIG. 12) is state #1 or state #3, then SG#2 is the preferred SG to be attached to the current host. The storage subsystem, e.g., 404 of FIG. 7b, therefore splits the local copy and attaches SG #2 to the host. In step 1604, when the state is #2, then SG #3 is the best SG to be attached to the current host. The storage subsystem therefore splits the local copy and attaches SG #2 to the host. Finally, if the state was not #1, #2 or #3, then the storage subsystem reports an error to the user or programmatic administrator (e.g., 704g of FIG. 7b).

While the present invention has been described herein with reference to particular embodiments thereof, a degree of latitude of modification, various changes and substitutions are intended in the foregoing disclosure, and it will be appreciated that in some instances some features of the invention will be employed without corresponding use of other features without departing from the spirit and scope of the invention as set forth.

What is claimed is:

1. A method, comprising:
    receiving, by a secondary storage, a data update including primary storage data stored in a primary storage area of a primary storage, wherein the data update is received by the secondary storage directly from the primary storage by means of a remote copy operation;
    storing the received primary storage data in a first secondary storage area;
    after the completion of the storing operation, determining if the storing has been successfully completed;
    storing a first status indicator indicating the status of the completed storing operation;
    after the determining, replicating data stored in the first secondary storage area into a second secondary storage area, if the storing operation has been successfully completed;
    storing a second status indicator indicating the status of the completed replication operation;
    receiving an attach command; and
    automatically determining, in response to the received attach command, a storage area to be attached to a host based on the first status indicator and the second status indicator, wherein the secondary storage is remote from the primary storage.

2. A method according to claim 1, wherein at least one of the primary storage and the secondary storage comprises a disk array.

3. A method according to claim 2, wherein the disk array is configured as at least one of a redundant array of independent disks ("RAID") and just a bunch of disks ("JBOD").

4. A method according to claim 2, wherein the primary storage area comprises at least one of a primary volume, a primary volume group, a secondary volume and a secondary volume group.

5. A method according to claim 1, wherein the data update includes at least one of unmodified primary storage data in the primary storage area, and one or more modifications to the primary storage data.

6. A method according to claim 1, wherein the data update further includes a modification indicator indicating modifications made to one or more data portions of the primary storage area.

7. A method according to claim 6, wherein the modification indicator includes a modification map.

8. A method according to claim 6, wherein the data portions include at least one of data blocks and tracks.

9. A method according to claim 1, wherein the data update includes a data backup indicator.

10. A method according to claim 1, wherein the synchronizing of a first secondary storage area includes copying one or more data portions of the primary storage data to one or more corresponding portions of the first secondary storage area.

11. A method according to claim 1, wherein the synchronizing of a second secondary storage area includes replicating one or more data portions of the first secondary storage data to one or more corresponding portions of the second secondary storage area.

12. A computer-readable storage medium embodying one or more sequences of instructions, which when executed by one or more processors, causes the one or more processors to perform the method comprising:
receiving, by a secondary storage, a data update including primary storage data stored in a primary storage area of a primary storage, wherein the data update is received by the secondary storage directly from the primary storage by means of a remote copy operation;
storing the received primary storage data in a first secondary storage area;
after the completion of the storing operation, determining if the storing has been successfully completed;
storing a first status indicator indicating the status of the completed storing operation;
after the determining, replicating data stored in the first secondary storage area into a second secondary storage area, if the storing operation has been successfully completed;
storing a second status indicator indicating the status of the completed replication operation;
receiving an attach command; and
automatically determining, in response to the received attach command, a storage area to be attached to a host based on the first status indicator and the second status indicator, wherein the secondary storage is remote from the primary storage.

13. A method according to claim 1, wherein the synchronizing of the second secondary storage area is conducted while the second secondary storage area is isolated from the first secondary storage area.

14. A secondary storage, comprising:
a storage controller;
storage media coupled to the storage controller; and
a replication manager coupled to the storage controller and operable to receive a primary data stored in a primary storage area of a primary storage, wherein the primary data is received by the replication manager of the secondary storage directly from the primary storage by means of a remote copy operation, store a corresponding first secondary storage data in a remote copy storage area of the secondary storage media and, after the completion of the storing operation, to determine whether storing the corresponding data has been successfully completed, to store a first status indicator indicating the status of the completed storing operation; and, after so determining, to store a corresponding second secondary storage data in a local copy storage area of the secondary storage media, to store a second status indicator indicating the status of the completed copy operation associated with the second secondary storage data, to receive an attach command and, automatically determine, in response to the received attach command, a storage data to be provided to a host based on the first status indicator and the second status indicator, wherein the secondary storage is remote from the primary storage.

15. A secondary storage according to claim 14, wherein the storing the corresponding first secondary storage data includes synchronizing the remote copy area with the primary storage area; and wherein the storing the corresponding second secondary storage data includes synchronizing the local copy area with the remote copy area.

16. A secondary storage according to claim 15, wherein the synchronizing the remote copy area includes copying one or more portions of the primary storage area to corresponding portions of the remote copy area, and synchronizing the local copy area includes replicating portions of the local copy area with corresponding portions of the remote copy area.

17. A secondary storage according to claim 14, wherein the primary storage includes a disk array and the primary storage area includes at least one of a primary volume and a secondary volume of the primary storage.

18. A system, comprising:
receiving means for receiving, by a secondary storage, a data update including primary storage data stored in a primary storage area of a primary storage, wherein the receiving means of the secondary storage is operable to receive the data update directly from the primary storage by means of a remote copy operation;
first storing means for storing the received primary storage data in a first secondary storage area;
determining means for determining, after the first storage means completes the storing operation, if the storing has been successfully completed;
first status indicator storing means for storing a first status indicator indicating the status of the completed storing operation;
replicating means for replicating, after the determining means completes the determination operation, first secondary storage area data of the first secondary storage area into a second secondary storage area, if the storing of the first secondary storage area has been successfully completed;

second status indicator storing means for storing a second status indicator indicating the status of the completed replication operation; and attaching means for receiving an attach command and automatically determining, in response to the received attach command, a storage area to be attached to a host based on the first status indicator and the second status indicator, wherein the secondary storage is remote from the primary storage.

19. A computing system storing program code for causing the computing system to perform the steps of:

receiving, by a secondary storage, a data update including primary storage data stored in a primary storage area of a primary storage, wherein the data update is received by the secondary storage directly from the primary storage by means of a remote copy operation;

storing the received primary storage data in a first secondary storage area;

after the completion of the storing operation, determining if the storing has been successfully completed;

storing a first status indicator indicating the status of the completed storing operation;

after the determining, replicating data stored in the first secondary storage area into a second secondary storage area, if the storing has been successfully completed;

storing a second status indicator indicating the status of the completed replication operation;

receiving an attach command; and automatically determining, in response to the received attach command, a storage area to be attached to a host based on the first status indicator and the second status indicator, wherein the secondary storage is remote from the primary storage.

20. A method, comprising:

receiving, by a secondary storage, a data access request corresponding to primary data stored in a primary data storage area of a primary data storage;

selecting, by the secondary storage, a secondary data storage area from among at least a remote copy storage area and a replicated copy storage area corresponding to the primary storage data; wherein the remote copy storage area stores a remote copy of the primary data received by the secondary storage directly from the primary storage by means of a remote copy operation and the replicated copy storage area stores a replicated copy of remote copy data by means of a replication operation; and wherein the selection is based on a stored first status indicator indicating a status of the remote copy operation and on a stored second status indicator indicating a status of the replication operation;

receiving an attach command;

attaching, in response to the attach command, the selected secondary data storage area to a host; and accessing, by the secondary storage, the selected secondary storage area in response to the request, wherein the secondary storage is remote from the primary storage.

21. A method according to claim 20, wherein at least one of the secondary storage and the primary storage includes a disk array.

22. A method according to claim 20, wherein the request corresponds to a data backup restore command.

23. A method according to claim 20, wherein the request corresponds to a data retrieval that has been re-directed from the primary storage to the secondary storage.

24. A method according to claim 23, wherein the request includes a data storage area indicator indicating a primary data storage area mapping.

25. A method according to claim 20, wherein the selecting imposes a preference for a first one of the remote copy and the replicated copy if the first one is determined to include valid data.

26. A method according to claim 20, wherein the access request includes a data retrieval request and the accessing includes retrieving data stored in the selected storage area.

27. A method according to claim 26, wherein the retrieving causes the retrieved data to be transferred to at least one of a primary storage host and an application server.

28. A method according to claim 20, further comprising causing data stored in a non-selected secondary storage area to be accessed in response to the request.

29. A secondary storage, comprising:

a storage controller;

storage media coupled to the storage controller; and a replication manager coupled to the storage controller capable of receiving a data access request corresponding to primary data stored in a primary data storage area of a primary data storage, selecting, based on a stored first status indicator indicating a status of a remote copy operation and on a stored second status indicator indicating a status of a replication operation, a secondary data storage area from among at least a remote copy storage area and a replicated copy storage area corresponding to the primary storage data and accessing the selected secondary storage area in response to the request, wherein the remote copy storage area stores a remote copy of the primary data received by the secondary storage directly from the primary storage by means of the remote copy operation and the replicated copy storage area stores a replicated copy of remote copy data by means of the replication operation, wherein the secondary storage is remote from the primary storage and wherein the replication manager is further operable to receive an attach command and to attach the selected secondary data storage area to a host.

30. A secondary storage according to claim 29, wherein at least one of the secondary storage and the primary storage includes a disk array.

31. A secondary storage according to claim 30, wherein the request corresponds to at least one of a data backup restore command and a data retrieval that has been re-directed from the primary storage to the secondary storage.

32. A secondary storage according to claim 30, wherein the selecting imposes a preference for a first one of the remote copy and the replicated copy if the first one is determined to include valid data.

33. A secondary storage according to claim 30, wherein the access request includes a data retrieval request and the accessing includes causing data stored in the selected storage area to be retrieved and transferred to at least one of a primary storage host and an application server.

34. A system, comprising:

receiving means for receiving, by a secondary storage, a data access request corresponding to primary data stored in a primary data storage area of a primary data storage;

selecting means for selecting, by the secondary storage, a secondary data storage area from among at least a remote copy and a replicated copy corresponding to the primary storage data received by the secondary storage directly from the primary storage by means of a remote copy operation, wherein the selection is based on a stored first status indicator indicating a status of the remote copy operation and on a stored second status indicator indicating a status of a replication operation;

attaching means for receiving an attach command and attaching the selected secondary data storage area to a host in response to the received attach command, and accessing means for accessing, by the secondary storage, the selected secondary storage area in response to the request, wherein the secondary storage is remote from the primary storage.

35. A computing system storing program code for causing the computing system to perform the steps of:

receiving, by a secondary storage, a data access request corresponding to primary data stored in a primary data storage area of a primary data storage;

selecting, by the secondary storage, a secondary data storage area from among at least a remote copy and a replicated copy corresponding to the primary storage data received by the secondary storage directly from the primary storage by means of a remote copy operation, wherein the selection is based on a stored first status indicator indicating a status of the remote copy operation and on a stored second status indicator indicating a status of a replication operation;

receiving an attach command;

attaching the selected secondary data storage area to a host in response to the received attach command, and accessing, by the secondary storage, the selected secondary storage area in response to the request, wherein the secondary storage is remote from the primary storage.

36. A method, comprising:

determining that a remote copy data portion corresponding to a local copy data portion is to be synchronized;

synchronizing the remote copy data portion by producing at least one of: a first state in which the remote copy data portion is synchronized and suspended and the local copy data portion is synchronized and suspended, a second state in which the remote copy data portion is resynchronized and the local copy is synchronized and suspended, and a third state in which the remote copy data portion is synchronized and suspended and the local copy data portion is resynchronized, wherein the remote copy data portion is synchronized using a remote copy operation performed directly between the secondary storage and the primary storage and wherein the secondary storage is remote from the primary storage;

determining if an actual state is the first state, the second state or the third state and attaching and selecting from among the remote copy data portion and the local copy data portion based on the result of the determination;

receiving an attach command; and attaching, in response to the received attach command, the selected data portion to a host.

37. A method of copying data among a primary volume, a first secondary volume and a second secondary volume, comprising:

copying data stored in the primary volume to the first secondary volume using a remote copy operation performed directly between the first secondary volume and the primary volume;

after copying data stored in the primary volume, copying data stored in the first secondary volume to the second secondary volume by means of a local copy operation;

isolating the first secondary volume from the primary volume;

isolating the second secondary volume from the first secondary volume;

after isolating the first secondary volume, re-synchronizing the first secondary volume with the primary volume;

after isolating the second secondary volume, re-synchronizing the second secondary volume with the first secondary volume, wherein the first secondary volume and the second secondary volume are located on the secondary storage and wherein the primary volume are located on the primary storage;

storing first status indicator indicating the status of the remote copy operation;

storing second status indicator indicating the status of the local copy operation;

receiving an attach command;

automatically selecting, in response to the received attach command, from among the first secondary volume and the second secondary volume based on the first status indicator and the second status indicator; and attaching, in response to the received attach command, the selected secondary volume to a host, wherein the first secondary volume is remote from the primary volume.

* * * * *